US012783172B2

(12) United States Patent
Jung et al.

(10) Patent No.: US 12,783,172 B2
(45) Date of Patent: Nov. 3, 2026

(54) STORAGE DEVICE WHICH PROVIDES DATA TRANSFER LENGTH HINT INFORMATION FOR STREAM PROGRAMMING OPERATIONS AND METHOD THEREOF

(71) Applicant: SAMSUNG ELECTRONICS CO., LTD., Suwon-si (KR)

(72) Inventors: Daejin Jung, Suwon-si (KR); Daejun Park, Suwon-si (KR); Hyung-Kyun Byun, Suwon-si (KR); Woochang Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/954,107

(22) Filed: Nov. 20, 2024

(65) Prior Publication Data

US 2025/0265018 A1 Aug. 21, 2025

(30) Foreign Application Priority Data

Feb. 19, 2024 (KR) ........................ 10-2024-0023557

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ....... G06F 3/0659; G06F 3/0679; G06F 3/061
See application file for complete search history.

(56) References Cited

U.S. PATENT DOCUMENTS

| | | | | |
|---|---|---|---|---|
| 6,922,754 | B2 | 7/2005 | Liu et al. | |
| 10,120,794 | B2 | 11/2018 | Shin | |
| 11,132,143 | B2 | 9/2021 | Jang et al. | |
| 11,188,251 | B2 | 11/2021 | Benisty et al. | |
| 11,537,510 | B2 | 12/2022 | Bennett et al. | |
| 11,556,464 | B2 | 1/2023 | Kim et al. | |
| 11,922,037 | B2 | 3/2024 | Byun et al. | |
| 2021/0149026 | A1 | 5/2021 | Yamada et al. | |
| 2021/0405913 | A1 * | 12/2021 | Stonelake | G06F 11/3037 |
| 2023/0259290 | A1 * | 8/2023 | Benisty | G06F 3/0659 711/154 |
| 2025/0044987 | A1 * | 2/2025 | Baek | G06F 3/0656 |

FOREIGN PATENT DOCUMENTS

| | | |
|---|---|---|
| EP | 4 174 861 A1 | 5/2023 |

* cited by examiner

*Primary Examiner* — Nicholas A. Paperno
(74) *Attorney, Agent, or Firm* — Sughrue Mion, PLLC

(57) ABSTRACT

A storage device includes a non-volatile memory device and a memory controller. The non-volatile memory device stores data. The memory controller controls the non-volatile memory device to generate data transfer length hint information. The data transfer length hint information indicates a data transfer length hint for a stream. The data transfer length hint indicates a length of data to be programmed in the non-volatile memory device through one program operation.

20 Claims, 19 Drawing Sheets

FIG. 13

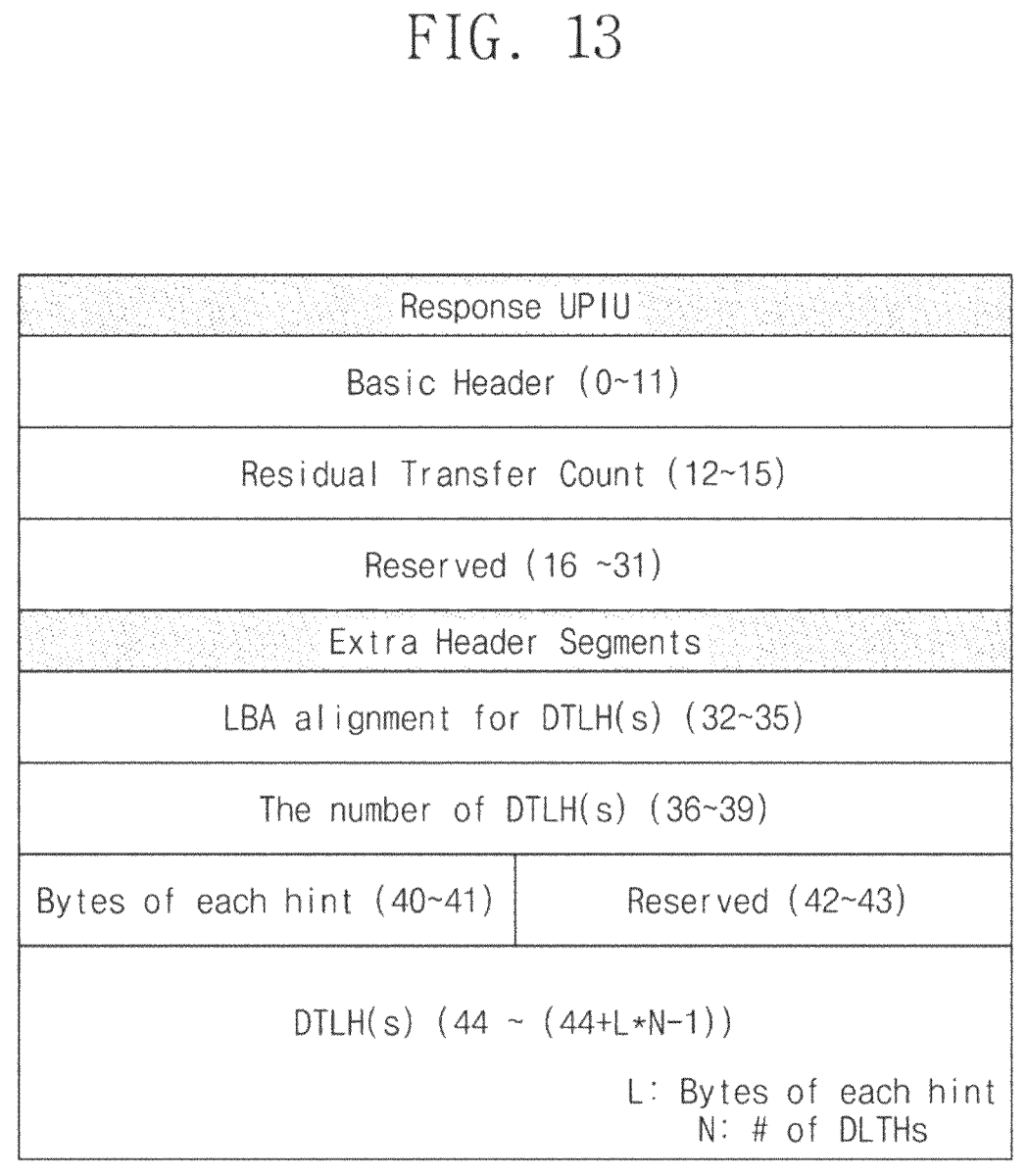

| | |
|---|---|
| Response UPIU | |
| Basic Header (0~11) | |
| Residual Transfer Count (12~15) | |
| Reserved (16 ~31) | |
| Extra Header Segments | |
| LBA alignment for DTLH(s) (32~35) | |
| The number of DTLH(s) (36~39) | |
| Bytes of each hint (40~41) | Reserved (42~43) |
| DTLH(s) (44 ~ (44+L*N-1))<br>L: Bytes of each hint<br>N: # of DLTHs | |

STORAGE DEVICE WHICH PROVIDES DATA TRANSFER LENGTH HINT INFORMATION FOR STREAM PROGRAMMING OPERATIONS AND METHOD THEREOF

CROSS-REFERENCE TO RELATED APPLICATION

This application claims priority under 35 U.S.C. § 119 to Korean Patent Application No. 10-2024-0023557 filed on Feb. 19, 2024, in the Korean Intellectual Property Office, the disclosure of which is incorporated by reference herein in its entirety.

BACKGROUND

The present disclosure relates to a semiconductor memory device, and more particularly, to a system including a non-volatile memory device and an operation method thereof.

A non-volatile memory device is being used for operations of various electronic devices. A NAND flash memory device is a representative non-volatile memory device and is being used to implement various devices such as universal flash storage (UFS) and a solid state drive (SSD). When the non-volatile memory device is used in a mobile environment, the non-volatile memory device is required to operate to correspond to a characteristic of a mobile device, such as a limited space or a limited power.

One possible limitation of a non-volatile memory device which is used in the mobile environment is an insufficient buffer space. To solve the above issue, technologies such as single level cell (SLC) backup and partially interleaving have been used. However, these techniques make result in an undesirable write amplification factor (WAF), and may affect the performance of an input/output (I/O) of the non-volatile memory device. Accordingly, there is a need for a new write method for providing sufficient buffer space and a non-volatile memory device to which the new write method is applied.

SUMMARY

One or more example embodiments provide a method and a device capable of programming data in a memory device without a separate technique when an internal buffer capacity of a storage device is limited.

According to an aspect of an example embodiment, a method of operating a storage device which includes a non-volatile memory device, includes: generating data transfer length hint information indicating a length of data to be programmed in the non-volatile memory device through one programming operation; sending the data transfer length hint information to a host; receiving a first write command for data of a first stream and the data of the first stream from the host, wherein the data of the first stream associated with the first write command correspond to the data transfer length hint information; and programming the data of the first stream in the non-volatile memory device.

According to another aspect of an example embodiment, a method of operating a storage device which includes a non-volatile memory device, includes: writing data of a first stream in the non-volatile memory device included in the storage device; sending a first response indicating the data of the first stream are completely written and one or more first data transfer length hints for the data of the first stream, to a host; and receiving a write command for the data of the first stream and the data of the first stream from the host, wherein the data of the first stream associated with the first write command correspond to the one or more first data transfer length hints. The one or more first data transfer length hints indicate one or more data lengths by which the data of the first stream are programmed in the non-volatile memory device through one programming operation.

According to another aspect of an example embodiment, a storage device includes: a non-volatile memory device configured to store data; and a memory controller configured to control the non-volatile memory device and to generate data transfer length hint information. The data transfer length hint information indicates one or more data transfer length hints for each of one or more streams. The data transfer length hints indicate one or more lengths of data to be programmed in the non-volatile memory device through one program operation.

According to another aspect of an example embodiment, a storage system includes: a storage device; and a host configured to exchange data with the storage device. The storage device includes: a non-volatile memory device configured to store data; and a memory controller configured to control the non-volatile memory device. The memory controller is further configured to generate data transfer length hint information associated with a length of data which the host sends to the storage device. The data transfer length hint information indicates one or more data transfer length hints of each of one or more streams. The data transfer length hints indicate one or more lengths of data to be programmed in the non-volatile memory device through one programming operation.

BRIEF DESCRIPTION OF THE FIGURES

The above and other aspects and features will be more apparent from the following description of example embodiments, taken in conjunction with the accompanying drawings, in which:

FIG. 13 is a diagram illustrating a response UPIU according to an example embodiment;

DETAILED DESCRIPTION

Figure 1:
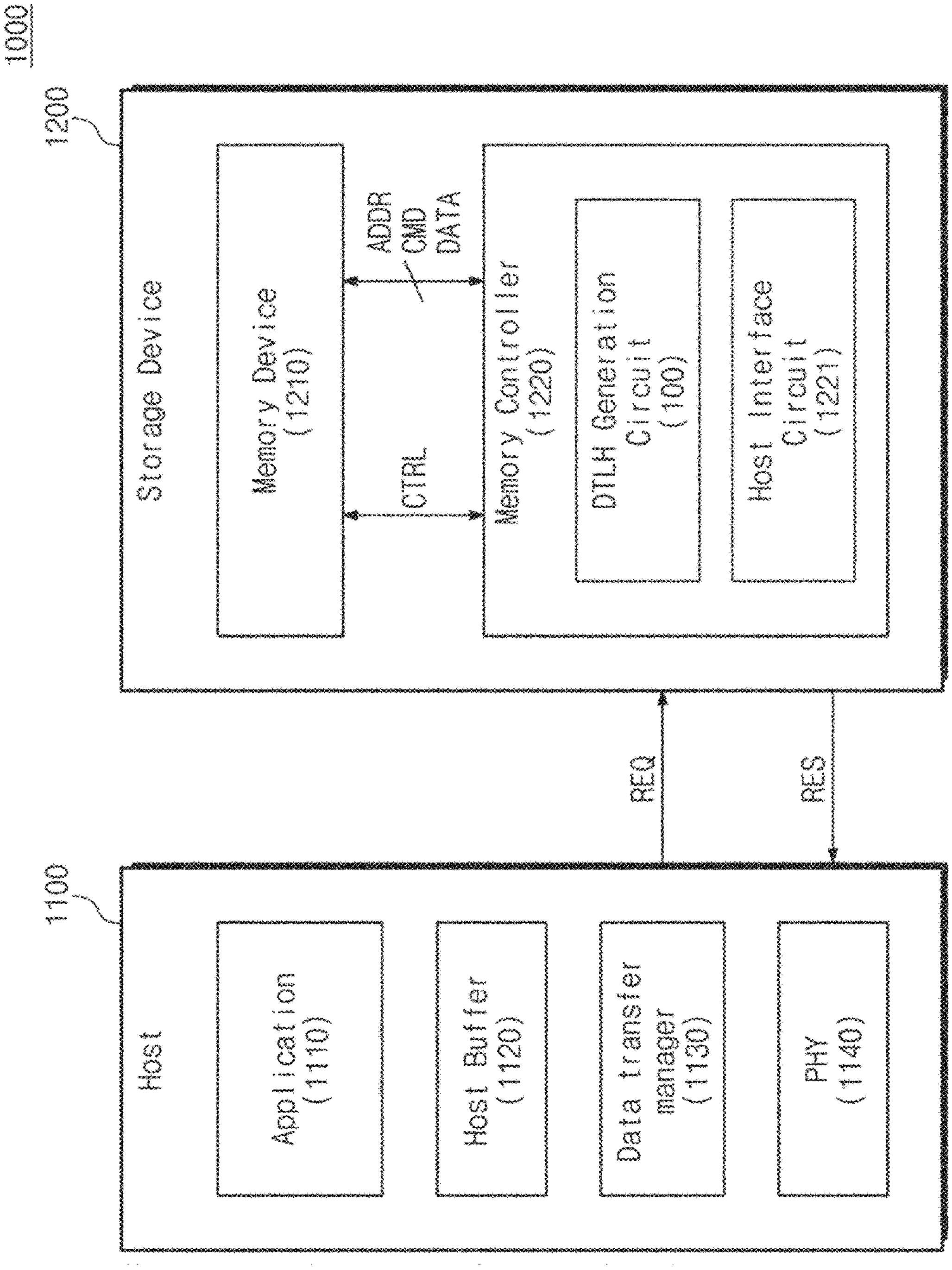
FIG. 1 is a block diagram illustrating a storage system, according to an example embodiment.

Below, example embodiments are described in detail with reference to the accompanying drawings. Like components are denoted by like reference numerals throughout the specification, and repeated descriptions thereof are omitted. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

FIG. 1 is a block diagram illustrating a storage system 1000, according to an example embodiment. Referring to FIG. 1, the storage system 1000 may include a host 1100 and a storage device 1200. The storage system 1000 may store data, may manage the stored data, and may provide information necessary for the user. In an example embodiment, the storage system 1000 may be included in an electronic device such as a personal computer (PC), a laptop computer, a tablet PC, a personal digital assistant (PDA), a wearable device, or a camera. However, this is provided as an example, and example embodiments are not limited to the case where the storage system 1000 is included in the above electronic devices.

The host 1100 may include an application 1110, a host buffer 1120, a data transfer manager 1130, and a physical layer (PHY) 1140. The host 1100 may exchange data with the storage device 1200. In an example embodiment, the host 1100 may send a request REQ to the storage device 1200 and may receive a response RES to the request REQ from the storage device 1200.

In an example embodiment, the request REQ or the response RES between the host 1100 and the storage device 1200 may indicate, or include, a command, data, etc. For example, the host 1100 and the storage device 1200 may operate in compliance with a universal flash storage (UFS) protocol. The request REQ or the response RES may have the format of the UFS protocol information unit (UPIU) defined by the UFS standard.

The application 1110 may be included in the host 1100 and may allow the host 1100 to perform various operations. For example, the application 1110 may allow the host 1100 to perform operations indicated by various programs or software through a processor (e.g., a central processing unit (CPU) or an application processor (AP)) of the host 1100. In an example embodiment, the application 1110 may generate data to be written in the storage device 1200, based on various operations.

The host buffer 1120 may temporarily store data to be written in the storage device 1200 or data read from the storage device 1200. In an example embodiment, the host buffer 1120 may temporarily store data generated based on the operation of the application 1110 or may temporarily store data necessary for the operation of the application 1110. The host buffer 1120 may include registers, a memory, etc. For example, the host buffer 1120 may include a plurality of registers, a volatile memory (e.g., a dynamic random access memory (DRAM) or a static random access memory (SRAM)), etc.

The data transfer manager 1130 may manage the transmission/reception of data or commands between the host 1100 and the storage device 1200. In an example embodiment, the data transfer manager 1130 may generate a command necessary for the operation of the storage device 1200. For example, the data transfer manager 1130 may generate a read command and an address value (e.g., a logical address value) targeted for the read operation such that data stored in the storage device 1200 are read. In an example embodiment, the data transfer manager 1130 may process commands and data in a form capable of being transmitted to the storage device 1200. For example, the data transfer manager 1130 may process and generate commands or data in the form of the UPIU.

The physical layer 1140 may perform communication between the host 1100 and the storage device 1200. For example, the physical layer 1140 may send the UPIU generated by the data transfer manager 1130 to the storage device 1200 or may receive data (e.g., including a data transfer length hint to be described later) or the UPIU from the storage device 1200.

The storage device 1200 may include a memory device 1210 and a memory controller 1220. FIG. 1 will be described based on an example in which one memory device 1210 and one memory controller 1220 are included, but example embodiments are not limited thereto. In an example embodiment, the storage device 1200 may include a plurality of memory devices and a plurality of memory controllers, and each memory controller may control one or more memory devices 1210.

The memory device 1210 may store data under control of the memory controller 1220. In an example embodiment, the memory device 1210 may be a non-volatile memory device such as a NAND flash memory, but example embodiments are not limited thereto. For example, the memory device 1210 may be implemented by using various kinds of non-volatile memory devices such as a magnetic random access memory (MRAM) and a ferroelectric random access memory) (FeRAM).

The memory device 1210 may receive various signals and data from the memory controller 1220. For example, the memory device 1210 may exchange data "DATA" with the memory controller 1220 and may receive a command CMD and an address ADDR from the memory controller 1220.

The memory device 1210 may receive a control signal CTRL from the memory controller 1220. A structure and an operation of the memory device 1210 will be described in detail with reference to FIG. 3.

The memory controller 1220 may control the storage device 1200. In an example embodiment, the memory controller 1220 may control the memory device 1210 based on various signals. For example, the memory controller 1220 may control the memory device 1210 through the command CMD and the address ADDR, and may identify or route the command CMD and the address ADDR through the control signal CTRL. The memory controller 1220 may receive the data "DATA" from the memory device 1210 or may send the data "DATA" to the memory device 1210. In an example embodiment, the memory controller 1220 may send or receive the command CMD, the address ADDR, and the data "DATA" to or from the memory device 1210 through a first signal line and may send the control signal CTRL to the memory device 1210 through a second signal line.

In an example embodiment, the memory controller 1220 may generate the command CMD and the address ADDR based on the request REQ received from the host 1100. For example, when the memory controller 1220 receives the request REQ corresponding to the data read operation of the memory device 1210 from the host 1100, the memory controller 1220 may generate the read command CMD and the address ADDR and may send the read command CMD and the address ADDR to the memory device 1210.

Referring to FIG. 1, the memory controller 1220 may include a host interface circuit 1221 and a data transfer length hint (DTLH) generation circuit 100. FIG. 1 shows an example in which the storage device 1200 includes only one memory controller 1220, but example embodiments are not limited thereto. For example, according to some example embodiments, the storage device 1200 may include a plurality of memory controllers 1220. In an example embodiment, each of the plurality of memory controllers 1220 may control at least one memory device 1210 based on the above operation. A structure and an operation of the memory controller 1220 will be described in detail with reference to FIG. 2.

The host interface circuit 1221 may perform communication between the storage device 1200 and the host 1100. For example, the host interface circuit 1221 may receive the request REQ from the host 1100 and may send the response RES to the request REQ to the host 1100. The host interface circuit 1221 may send the request REQ received from the host 1100 to other components of the memory controller 1220.

The data transfer length hint generation circuit 100 may generate data transfer length hint (DTLH) information or one or more data transfer length hints of one or more streams, respectively. The data transfer length hint may indicate a data transfer length, which the storage device 1200 requires (or prefers) from the host 1100. Alternatively, the data transfer length hint may indicate a data transfer length (or a data transfer length unit) of data, which the host 1100 sends to the storage device 1200, and the data transfer length may be preferred by the storage device 1200. For example, when the data transfer length hint indicates 192 KB, the host 1100 may send data to be written in the storage device 1200 in units of 192 KB. For another example, when the data transfer length hint indicates 192 KB, the host 1100 may send data to be written in the storage device 1200 in units of a multiple of 192 KB.

In an example embodiment, the data transfer length hint generation circuit 100 may generate the data transfer length hint for each stream of data. For example, the data transfer length hint generation circuit 100 may generate one or more first data transfer length hints for a first stream and may generate one or more second data transfer length hints for a second stream. An operation of the data transfer length hint generation circuit 100 will be described in detail with reference to FIGS. 8 to 17.

In an example embodiment, the host 1100 may include a memory, a buffer, or registers which store data transfer length hint information received from the storage device 1200 or one or more data transfer length hints of each of at least one stream. For example, the host 1100 may include a random access memory (RAM) or registers which store data transfer length hint information or one or more data transfer length hints of each of at least one stream. In another example embodiment, the host 1100 may store data transfer length hint information or one or more data transfer length hints of each of at least one stream in the host buffer 1120.

Figure 2:
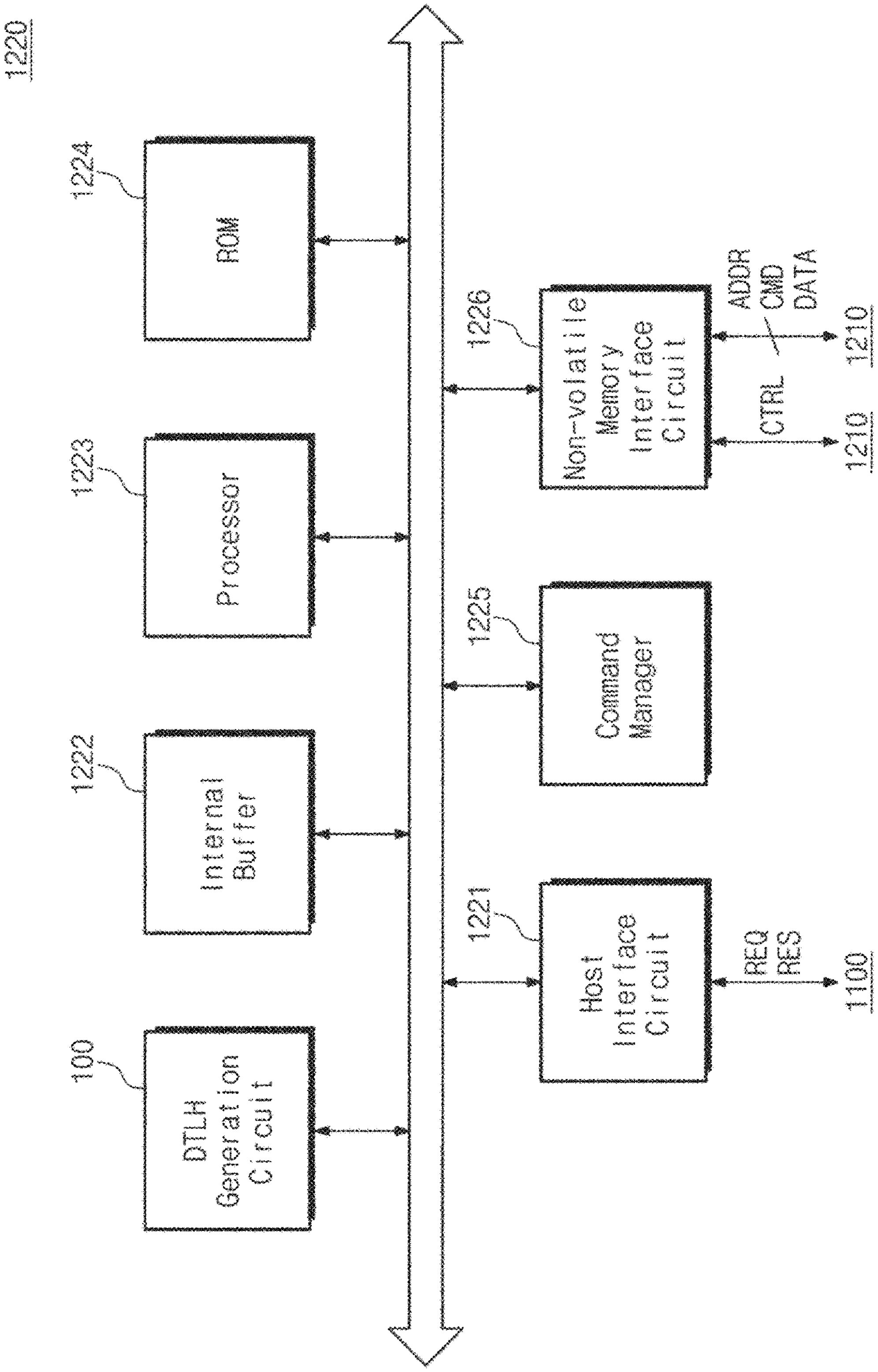
FIG. 2 is a block diagram illustrating a memory controller in detail, according to an example embodiment.

FIG. 2 is a block diagram illustrating the memory controller 1220 of FIG. 1 in detail, according to an example embodiment. Referring to FIG. 2, the memory controller 1220 may include the host interface circuit 1221, the data transfer length hint generation circuit 100, an internal buffer 1222, a processor 1223, a read-only memory (ROM) 1224, a command manager 1225, and a non-volatile memory interface circuit 1226. The memory controller 1220 according to an example embodiment will be described in with reference to FIG. 2.

The host interface circuit 1221 may correspond to the host interface circuit 1221 of FIG. 1. The host interface circuit 1221 may perform communication between the memory controller 1220 or the storage device 1200 and the host 1100. The data transfer length hint generation circuit 100 may correspond to the data transfer length hint generation circuit 100 of FIG. 1 and may generate a data transfer length hint. The data transfer length hint generation circuit 100 may calculate or identify a transfer length unit of data to be written in the memory device 1210 of FIG. 1, and generate information indicating the transfer length unit of data.

The internal buffer 1222 may be used as a main memory, a cache memory, or an operation memory of the memory controller 1220. In an example embodiment, the internal buffer 1222 may be implemented with an SRAM or a DRAM. For example, the internal buffer 1222 may be implemented with a combination of an SRAM and a DRAM. In an example embodiment, the internal buffer 1222 may temporarily store data to be written in the memory device 1210 or data read from the memory device 1210. For example, the internal buffer 1222 may include an SRAM and may temporarily store data to be written in the memory device 1210.

The processor 1223 may control all the operations of the memory controller 1220. In an example embodiment, the processor 1223 may generate the UPIU, based on a result by an operation of the storage device 1200 (i.e., result for the program operation in memory device 1210). For example, the processor 1223 may generate a response UPIU including (or indicating) the data transfer length hint.

The ROM 1224 may be used as a read only memory which stores information necessary for the operation of the memory controller 1220. The command manager 1225 may be used to generate the command CMD corresponding to an operation which the request REQ received from the host 1100 indicates.

The non-nonvolatile memory interface circuit 1226 may perform communication between the memory controller 1220 and the memory device 1210. For example, the non-volatile memory interface circuit 1226 may perform the transmission/reception of the data "DATA" between the memory controller 1220 and the memory device 1210 or may send the address ADDR or the command CMD to the memory device 1210. For another example, the non-volatile memory interface circuit 1226 may send the control signal CTRL of the memory controller 1220 to the memory device 1210.

The memory controller 1220 illustrated and described in FIG. 2 is an example, and example embodiments are not limited thereto. For example, the memory controller 1220 may further include a zone manager managing zones of the memory device 1210 or an error correction code (ECC) engine correcting an error caused in the operation of the memory device 1210. For another example, the memory controller 1220 may not include some (e.g., the ROM 1224 or the command manager 1225) of the illustrated and described components.

The configuration illustrated and described in FIG. 2 is an example, and example embodiments are not limited thereto. According to an example embodiment, operation of each component of the memory controller 1220 of FIG. 2 may be performed by another component of the memory controller 1220. For example, according to an example embodiment, the processor 1223 performs various operations including operations which the data transfer length hint generation circuit 100 and the command manager 1225 perform.

Figure 3:
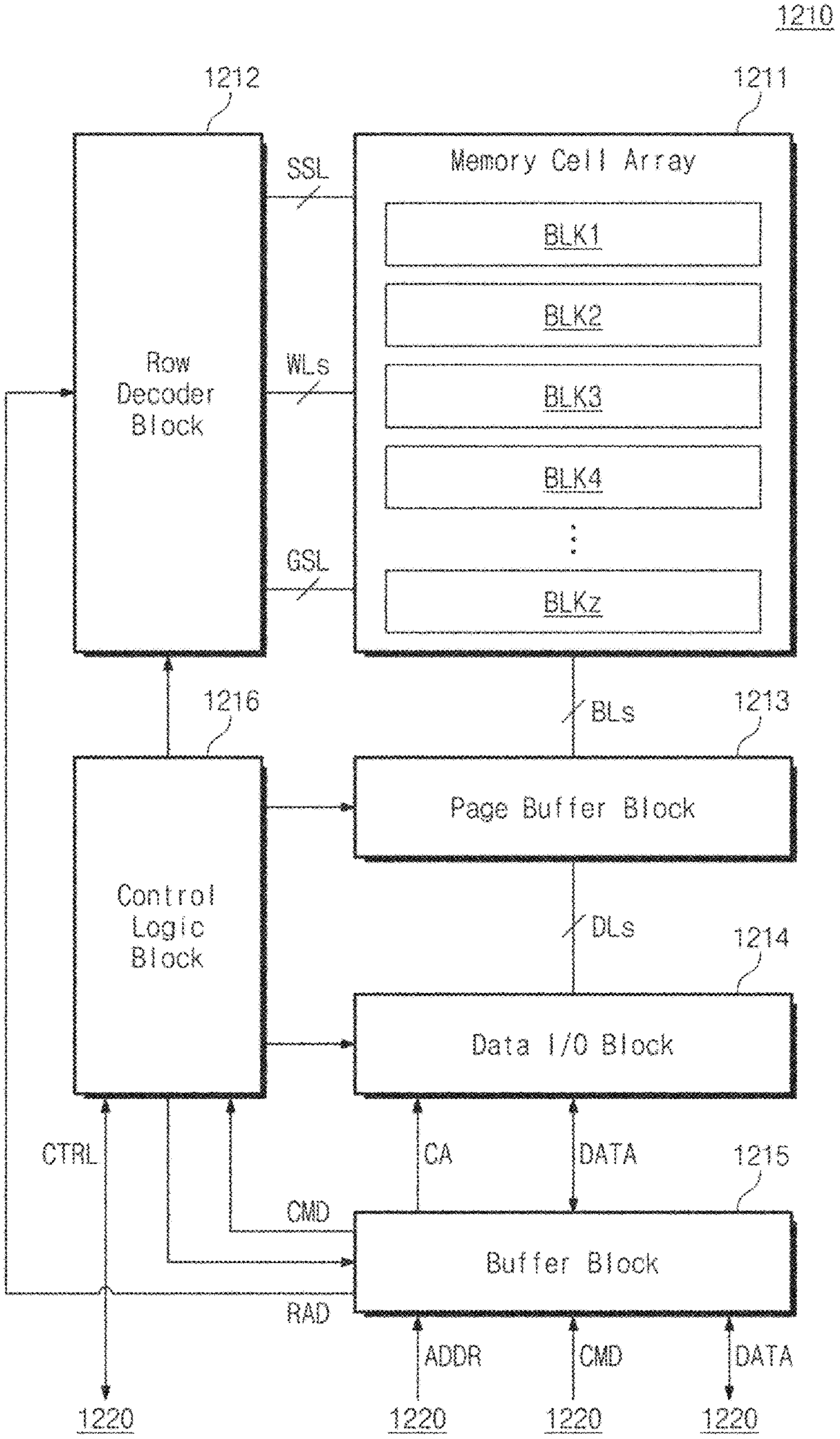
FIG. 3 is a block diagram illustrating a memory device in detail, according to an example embodiment.

FIG. 3 is a block diagram illustrating the memory device 1210 of FIG. 1 in detail, according to an example embodiment. Referring to FIG. 3, the memory device 1210 may include a memory cell array 1211, a row decoder block (e.g., a row decoder circuit) 1212, a page buffer block (e.g., a page buffer circuit) 1213, a data input/output (I/O) block (e.g., a data IO circuit) 1214, a buffer block (e.g., a buffer circuit) 1215, and a control logic block (e.g., a control logic circuit) 1216. The memory device 1210 according to an example embodiment will be described in detail with reference to FIG. 3.

The memory cell array 1211 includes a plurality of memory blocks BLK1 to BLKz. Each of the memory blocks BLK1 to BLKz may include a plurality of memory cells. Each of the memory blocks BLK1 to BLKz may be connected to the row decoder block 1212 through at least one ground selection line GSL, wordlines WLs, and at least one string selection line SSL. Some of the wordlines WLs may be used as dummy wordlines. Each of the memory blocks BLK1 to BLKz may be connected to the page buffer block 1213 through a plurality of bitlines BLs. The plurality of memory blocks BLK1 to BLKz may be connected in common to the plurality of bitlines BLs.

In an example embodiment, each of the plurality of memory blocks BLK1 to BLKz may be a unit of the erase operation. The memory cells belonging to each of the memory blocks BLK1 to BLKz may be simultaneously erased. In another example embodiment, each of the plurality of memory blocks BLK1 to BLKz may be divided into sub-blocks. Each of the plurality of sub-blocks may be a unit of the erase operation, and a plurality of memory cells belonging to each sub-block may be simultaneously erased. The erase unit may indicate the unit of the erase operation, and the erase unit may correspond to a memory block or a sub-block.

Each of the memory blocks BLK1 to BLKz may include a plurality of pages. The plurality of pages may be respectively connected to the wordlines WLs. Each of the pages may be a unit of the write operation.

Bits which are written in memory cells of one page may constitute logical pages. For example, when three bits are written in one memory cell, one physical page may include three logical pages. For another example, when one bit is written in one memory cell, one physical page may include one logical page. The logical page(s) or the physical page may be a unit of the read operation. The memory blocks BLK1 to BLKz will be described in detail with reference to FIG. 4.

The row decoder block 1212 may decode a row address RAD received from the buffer block 1215 and may control voltages to be applied to the string selection lines SSL, the wordlines WLs, and the ground selection lines GSL depending on the decoded row address RAD.

The page buffer block 1213 may be connected to the memory cell array 1211 through the plurality of bitlines BLs. The page buffer block 1213 may be connected to the data input/output block 1214 through a plurality of data lines DLs. The page buffer block 1213 may operate under control of the control logic block 1216.

When the memory device 1210 performs the program operation, the page buffer block 1213 may store data to be written in memory cells. The page buffer block 1213 may apply a corresponding voltage to each of the plurality of bitlines BLs, based on the data stored therein. When the memory device 1210 performs the read operation or performs a verifying read operation of the program operation or the erase operation, the page buffer block 1213 may sense voltage of each of the bitlines BLs and may store a sensing result.

The data input/output block 1214 may be connected to the page buffer block 1213 through the plurality of data lines DLs. The data input/output block 1214 may receive a column address CA from the buffer block 1215. The data input/output block 1214 may output the data read by the page buffer block 1213 to the buffer block 1215 depending on the column address CA. The data input/output block 1214 may send the data received from the buffer block 1215 to the page buffer block 1213, based on the column address CA.

The buffer block 1215 may receive the command CMD or the address ADDR from an external device (e.g., the memory controller 1220) and may exchange the data "DATA" with the external device. The buffer block 1215 may operate under control of the control logic block 1216. The buffer block 1215 may send the command CMD to the control logic block 1216, may send the row address RAD of the address ADDR to the row decoder block 1212, and may send the column address CA of the address ADDR to the data input/output block 1214. The buffer block 1215 may exchange the data "DATA" with the data input/output block 1214.

The control logic block 1216 may receive the control signal CTRL through the external device (e.g., the memory controller 1220). The control logic block 1216 may allow the buffer block 1215 to route the command CMD, the address ADDR, and the data "DATA". The control logic block 1216 may decode the command CMD received from the buffer block 1215 and may control the memory device 1210 based on the decoded command.

In an example embodiment, the memory device 1210 may be manufactured in a bonding method. The memory cell array 1211 may be manufactured by using a first wafer, and the row decoder block 1212, the page buffer block 1213, the data input/output block 1214, the buffer block 1215, and the control logic block 1216 may be manufactured by using a second wafer. The memory device 1210 may be implemented by coupling the first wafer and the second wafer such that an upper surface of the first wafer and an upper surface of the second wafer face each other.

In another example embodiment, the memory device 1210 may be manufactured in a cell over peri (COP) method. A peripheral circuit including the row decoder block 1212, the page buffer block 1213, the data input/output block 1214, the buffer block 1215, and the control logic block 1216 may be implemented on a substrate. The memory cell array 1211 may be implemented over the peripheral circuit. The peripheral circuit and the memory cell array 1211 may be connected by using through vias.

Figure 4:
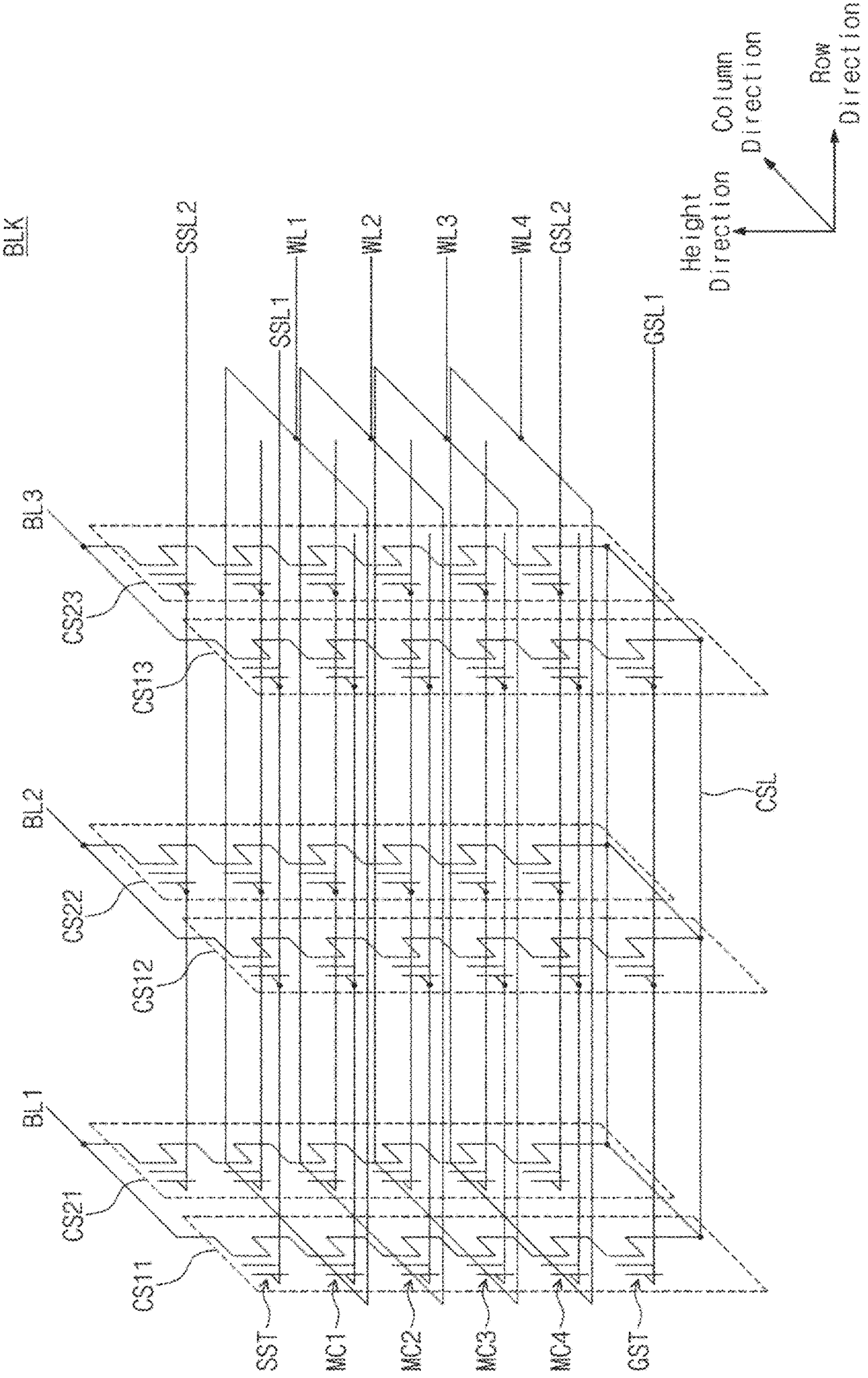
FIG. 4 is a diagram illustrating a structure of one block of a memory cell array, according to an example embodiment.

FIG. 4 is a circuit diagram illustrating one block BLK among the plurality of memory blocks BLK1 to BLKz of the memory cell array 1211 of FIG. 3, according to an example embodiment. The memory block BLK according to an example embodiment will be described with reference to FIG. 4.

FIG. 4 shows the memory block BLK. However, this is provided as an example for description, and example embodiments are not limited thereto. Referring to FIG. 4, the memory block BLK may include a plurality of cell strings CS11, CS21, CS12, CS22, CS13, and CS23. The plurality of cell strings CS11, CS21, CS12, CS22, CS13, and CS23 may be arranged in a row direction and a column direction, and may extend in a vertical direction.

Cell strings located at the same column from among the plurality of cell strings CS11, CS21, CS12, CS22, CS13, and CS23 may be connected to the same bitline. Cell strings located at the same row from among the plurality of cell strings CS11, CS21, CS12, CS22, CS13, and CS23 may be connected to different bitlines. For example, the cell strings CS11 and CS21 may be connected to a first bitline BL1, the cell strings CS12 and CS22 may be connected to a second bitline BL2, and the cell strings CS13 and CS23 may be connected to a third bitline BL3.

Each of the plurality of cell strings CS11, CS21, CS12, CS22, CS13, and CS23 may include a plurality of cell transistors. Each of the plurality of cell transistors may be implemented with a charge trap flash (CTF) memory cell. The plurality of cell transistors may be stacked in a height direction being a direction perpendicular to a plane (e.g., a semiconductor substrate) which is perpendicular to a plane defined by the row direction and the column direction.

The plurality of cell transistors may be connected between the corresponding bitline (e.g., one of the first bitline BL1 to the third bitline BL3) and a common source line CSL. For example, the plurality of cell transistors may include a string selection transistor GST, memory cells MC1 to MC4, and a ground selection transistor GST. The string selection transistor SST may be provided between the serially-connected memory cells MC1 to MC4 and the corresponding bitline (e.g., one of the first bitline BL1 to the third bitline BL3). The ground selection transistor GST may be provided between the serially-connected memory cells MC1 to MC4 and the common source line CSL.

In the plurality of cell strings CS11, CS21, CS12, CS22, CS13, and CS23, memory cells located at the same height may share the same wordline. For example, the first memory cells MC1 of the plurality of cell strings CS11, CS21, CS12, CS22, CS13, and CS23 may be located at the same height from the substrate and may share a first wordline WL1. The second memory cells MC2 of the plurality of cell strings CS11, CS21, CS12, CS22, CS13, and CS23 may be located at the same height from the substrate and may share a second wordline WL2. Likewise, the second and third memory cells MC3 and MC4 of the plurality of cell strings CS11, CS21, CS12, CS22, CS13, and CS23 may share corresponding wordlines.

In an example embodiment, memory cells belonging to cell strings of the same row from among memory cells located at the same height may constitute one page. For example, memory cells included in the cell strings CS11, CS12 and CS13 from among the first memory cells MC1 may constitute the first page. In this case, the memory cells of the first page may share the same wordline and may respectively correspond to different bitline lines. According to the above description, the memory cells of the first page may be simultaneously programmed and may be simultaneously read.

String selection transistors located at the same height and the same row from among the string selection transistors SST of the plurality of cell strings CS11, CS21, CS12, CS22, CS13, and CS23 may be connected to the same string selection line SSL1 or SSL2. For example, the cell strings CS11, CS12, and CS13 may be connected to the first string selection line SSL1. The cell strings CS21, CS22, and CS23 may be connected to the second string selection line SSL2.

Ground selection transistors located at the same height and the same row from among the ground selection transistors GST of the plurality of cell strings CS11, CS21, CS12, CS22, CS13, and CS23 may be connected to the same ground selection line GSL1 or GSL2.

The memory block BLK of FIG. 4 is provided as an example. For example, the number of cell strings may increase or decrease, and the number of rows of cell strings and the number of columns of cell strings may increase or decrease depending on the change in the number of cell strings. Also, the number of cell transistors (e.g., GST, MC, and SST) of the memory block BLK may increase or decrease, and the height of the memory block BLK may increase or decrease depending of the number of cell transistors. Also, the number of lines (e.g., GSL, WL, and CSL) connected to cell transistors may increase or decrease depending on the number of cell transistors, and transistors for controlling an operation may be further included depending on a characteristic of the memory block BLK.

Figure 5:
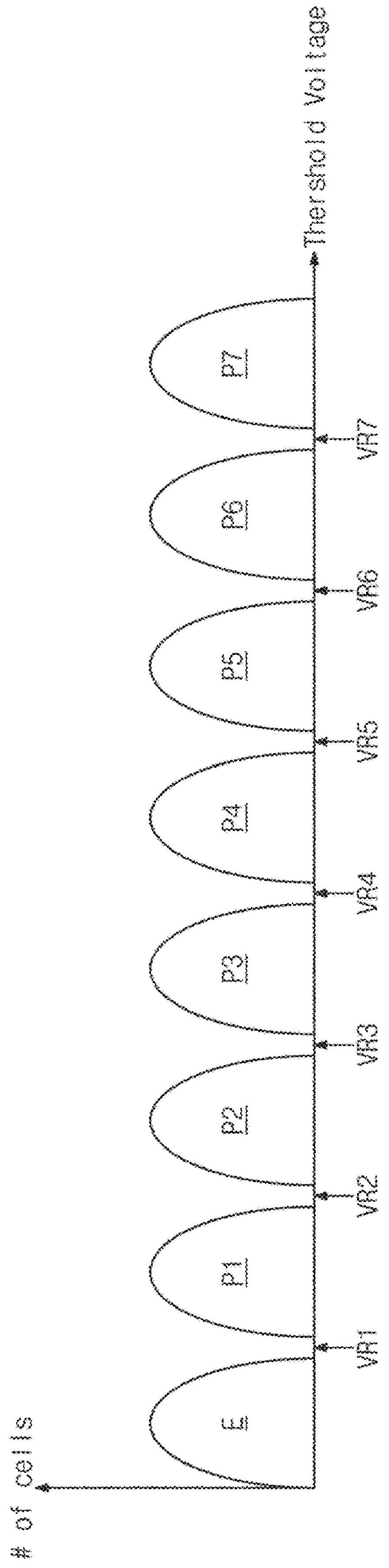
FIG. 5 is a graph illustrating how data are stored in memory cells, according to an example embodiment.

FIG. 5 is a diagram illustrating threshold voltage distributions of the plurality of memory cells MC1 to MC4 included in the memory block BLK of FIG. 4. In FIG. 5, the horizontal axis represents a threshold voltage Vth, and the vertical axis represents the number of memory cells. FIG. 5 shows threshold voltage distributions of triple level cells (TLCs) each configured to store 3 bits. However, example embodiments are not limited thereto. For example, each of the plurality of memory cells may be variously implemented with a single level cell (SLC), a multi-level cell (MLC), a quad-level cell (QLC), a penta level cell (PLC), etc., and example embodiments may be applied thereto.

For example, when the memory cell is programmed in an SLC manner, the memory cell may have one of an erase state "E" or a first program state P1. In this case, a voltage for distinguishing the states "E" and P1 may be greater than a first read voltage VR1 illustrated in FIG. 5. For another example, when the memory cell is programmed in an MLC manner, the memory cell may have the erase state "E" or one of the first to third program states P1 to P3. In this case, voltages VR1, VR2, and VR3 for distinguishing the states "E" and P1 to P3 may be greater than voltages illustrated in FIG. 5.

Referring to FIGS. 3 to 5, the memory device 1210 may store data in memory cells by controlling threshold voltages of the memory cells. Each of the memory cells may be programmed to have the erase state "E" or one of first to seventh program states P1 and P7.

The memory device 1210 may read the data stored in the memory cells by sensing program states of the memory cells. For example, the memory device 1210 may read the data stored in the memory cells by sensing the threshold voltages of the memory cells by using first to seventh read voltages VR1 to VR7.

An example in which all the first to seventh read voltages VR1 to VR7 are positive voltages is illustrated in FIG. 5, but example embodiments are not limited thereto. For example, the lowest voltage of the erase state "E" and the lowest voltage of the first program state P1 may be negative voltages. Below, for convenience of description, an example embodiment will be described based on a triple level cell. However, example embodiments are not limited thereto. For example, it may be understood that example embodiments are applicable to various memory cells, which store two bits or four or more bits, such as an MLC, a QLC, and a PLC.

Figure 6:
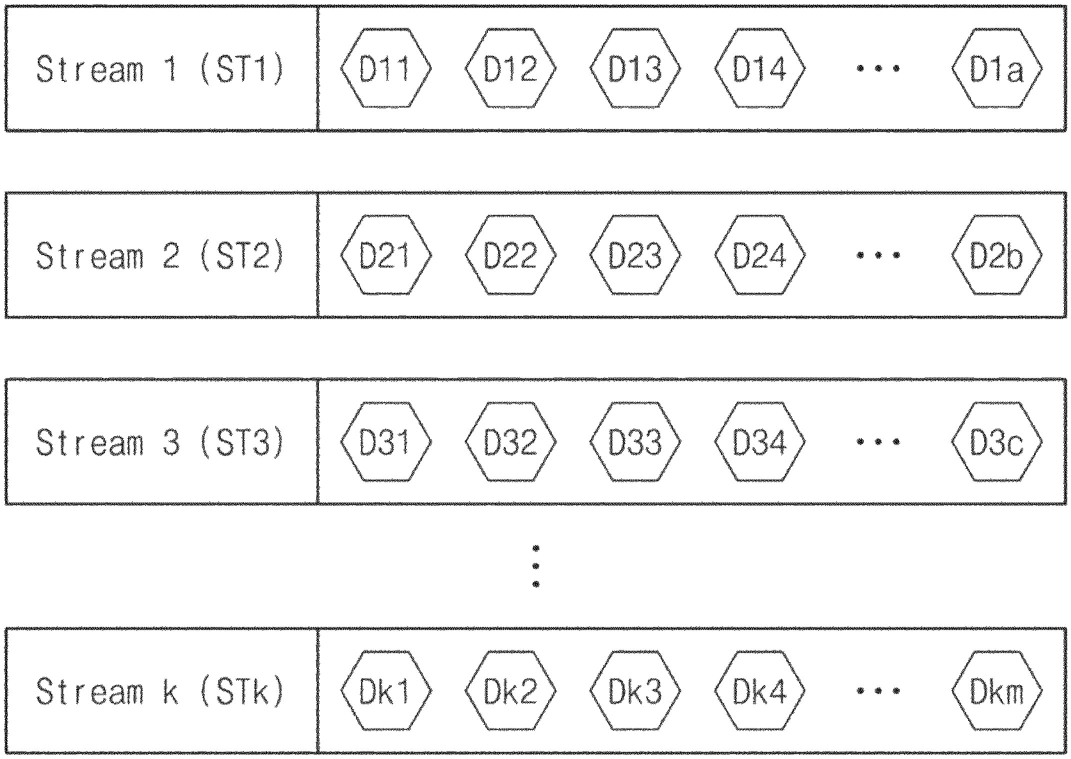
FIG. 6 is a diagram illustrating an example in which a host and a storage device manage data, according to an example embodiment.

FIG. 6 is a diagram illustrating an example of a method in which the host 1100 or the storage device 1200 manages data, according to an example embodiment. An example embodiment in which data of the storage system 1000 are managed will be described with reference to FIG. 6.

The data of the storage system 1000 may be divided into a plurality of streams. The data may be classified as one of a plurality of streams ST1 to STk, based on various criteria. For example, the data may be classified as one of the plurality of streams ST1 to STk, based on required performance or the frequency of access by an external device. That is, in data belonging to the same stream, the required performance or the frequency of access by the external device may be identical or similar. For example, the required performance or the frequency of access of the external device of each data included in the first stream ST1 may be identical or similar, and the required performance of the first stream ST1 may be greater than the required performance of the second stream ST2.

Referring to FIG. 6, the storage system 1000 may classify and manage data into the first stream ST1 to the k-th stream STk. In an example embodiment, "k" may indicate the number of streams defined in the storage system 1000. For example, when the storage system 1000 is a mobile system, "k" may be "6", and the storage system 1000 may manage a total of six streams.

Each of the streams ST1 to STk may include one or more data fragments. For example, the first stream ST1 may include first data fragments D11 to D1*a*, and the second stream ST2 may include second data fragments D21 to D2*b*. In an example embodiment, each of "a", "b", and "c" to "m" may respectively indicate the number of data fragments included in the streams ST1 to STk. In an example embodiment, each data fragment may correspond to a unit of a data transfer between the host 1100 and the storage device 1200. In an example embodiment, sizes of data fragments may be identical to each other. For example, the size of each data fragment may be 64 KB. Below, the streams ST1 to STk will be described in detail with reference to FIG. 8. In another example embodiment, sizes of at least some of data fragments may be different from each other.

An example in which all the streams ST1 to STk include data fragments is illustrated in FIG. 6, but example embodiments are not limited thereto. An example embodiment in which some of the streams ST1 to STk may not include data fragments depending on an operation method of the storage system 1000 or a characteristic of generated data may also be included as an example embodiment. For example, depending on the operation of the storage system 1000, the first stream ST1 and the third stream ST3 may include some data fragments, and the second stream ST2 may not include any data fragment.

Figure 7A:
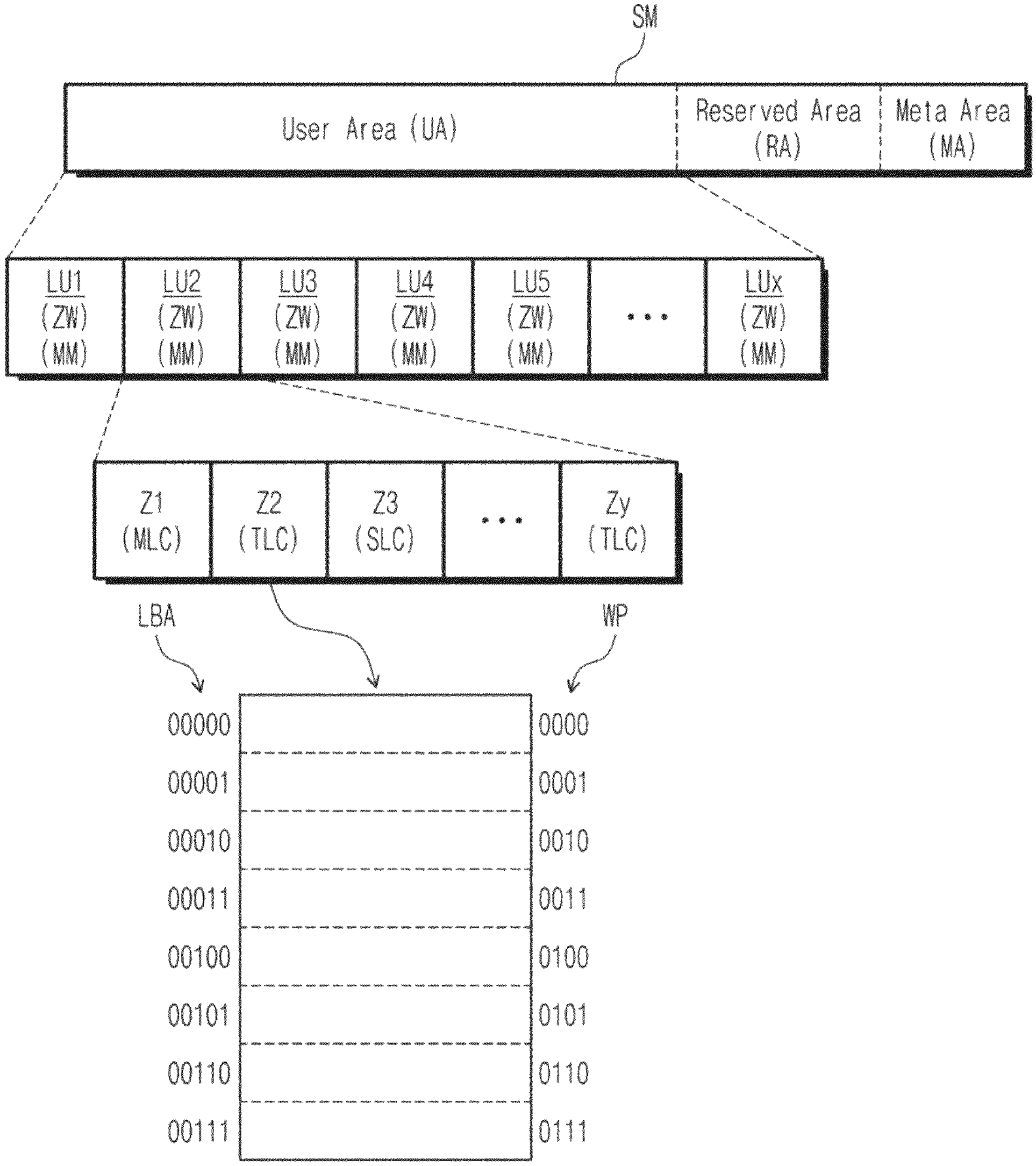
FIGS. 7A and 7B are block diagrams illustrating examples in which a memory controller manages a storage space, according to an example embodiment.
Figure 7B:
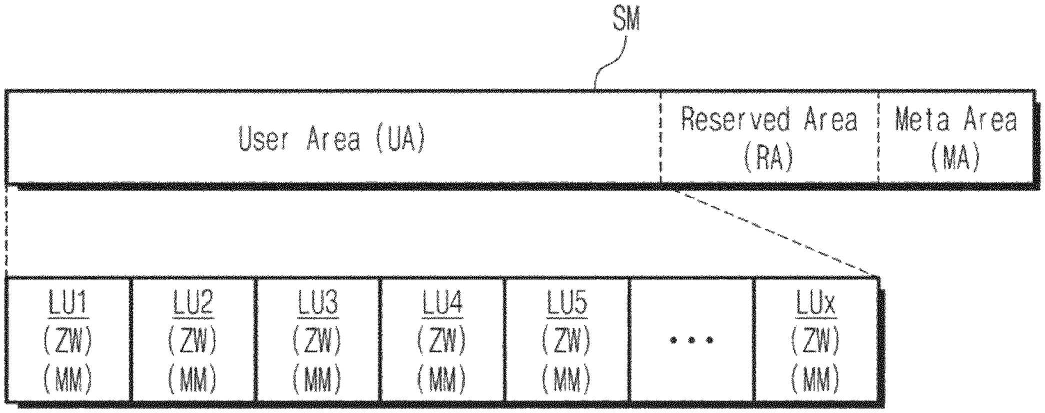

FIGS. 7A and 7B are block diagrams illustrating examples in which the memory controller 1220 of FIG. 1 manages a storage space SM of the memory device 1210, according to example embodiments. Example embodiments in which the memory controller 1220 of FIG. 1 manages the storage space SM of the memory device 1210, will be described with reference to FIGS. 7A and 7B.

FIG. 7A is a block diagram illustrating an example embodiment in which the memory controller 1220 manages the storage space SM of the memory device 1210. Referring to FIGS. 1, 3, and 7A together, the storage space SM may include a user area UA, a reserved area RA, and a meta area MA. Each of the user area UA, the reserved area RA, and the meta area MA may include a plurality of erase units.

The memory controller 1220 may provide the user area UA as a storage space which the host 1100 is capable of accessing. The host 1100 may allocate a logical address to the user area UA. The memory controller 1220 may not provide the reserved area RA to the host 1100. The memory controller 1220 may use the reserved area RA to improve the performance of the storage device 1200. For example, the memory controller 1220 may use the reserved area RA as a memory for replacing a bad block or as a backup memory. Likewise, the memory controller 1220 may not provide the meta area MA to the host 1100 and may store metadata necessary for the storage device 1200 to operate in the meta area MA.

The memory controller 1220 may divide the user area UA into a plurality of logical units LU1 to LUx (below, "x" indicates the number of logical units). Each of the logical units LU1 to LUx may include one or more memory blocks or erase units. In an example embodiment, each of the logical units LU1 to LUx may be allocated to support a zone write ZW.

The memory controller 1220 may allocate zones to a logical unit allocated to support the zone write ZW. For example, referring to FIG. 7A, the memory controller 1220 may allocate a first zone Z1, a second zone Z2, . . . , a y-th zone Zy. In an example embodiment, "y" may indicate the number of zones Z1 to Zy. The number of zones allocated to each of the logical units LU1 to LUx may be determined by the host 1100 or the storage device 1200. Each of the zones Z1 to Zy may include at least one erase unit.

The memory controller 1220 may map erase units and zones by using a zone map table and may map logical addresses and pages by using a page map table. That is, the memory controller 1220 may manage the logical units LU1 to LUx allocated to support the zone write ZW by using a multi-level map table MM including two or more map tables.

The memory controller 1220 may allocate sequential logical addresses to each zone in a fixed state. The memory controller 1220 may fixedly and sequentially manage logical addresses of data written in a plurality of zones. That is, in a logical unit allocated to support the zone write ZW, data of a specific logical address may be always written at a location on a fixed logical address of a fixed zone.

Depending on the request of the host 1100, the memory controller 1220 may open a specific zone. In an example embodiment, the memory controller 1220 may fix a cell type of the opened zone to one cell type or may select one of two or more different cell types. In an example embodiment, cell types of two arbitrary zones among zones may be different from each other. For example, the cell type of the first zone Z1 of the second logical unit LU2 may be an MLC type, the cell type of the second zone Z2 may be a TLC type, and the cell type of the third zone Z3 may be an SLC type.

In association with the opened zone, the host 1100 may be prescribed to request sequential writes based on sequential logical addresses from the storage device 1200. The memory controller 1220 may be prescribed to map sequential physical addresses of erase units to sequential logical addresses of each zone. That is, the sequentiality of logical addresses and physical addresses in each zone may be guaranteed. Referring to FIG. 7A, logical addresses LBA of 00000, 00001, 00010, 00011, 00100, 00101, 00110, and 00111 may be allocated to the second zone Z2, and 0000, 0001, 0010, 0011, 0100, 0101, 0110, and 0111 may be allocated to write pointers (e.g., physical addresses) WP in the same order. Logical addresses and physical addresses may have the fixed sequentiality. In the case of a random write RW to be described later, based on the condition that logical addresses and physical addresses have the fixed sequentiality, the memory controller 1220 may access a zone based on a zone map table and a logical address, without a page map table.

When a zone is full of data or depending on the request REQ of the host 1100, the memory controller 1220 may close the zone. When the zone is closed, the memory controller 1220 may prohibit an additional write for the closed zone. The memory controller 1220 may manage the closed zone as a read-only zone.

In an example embodiment, the memory controller 1220 may also manage zones, which are not opened, in the zone map table. The memory controller 1220 may manage the status of each zone at least as "Opened", "Closed", or "Not opened" in the zone map table.

In an example embodiment, the memory controller 1220 may store the zone map table and the page map table PM of the logical units LU allocated to support the zone write ZW or the multi-level map table MM in the meta area MA. The memory controller 1220 may load and use a portion of the page map table and the zone map table of the logical unit LU to the internal buffer 1222.

FIG. 7B is a block diagram illustrating an example embodiment in which the memory controller 1220 manages the storage space SM of the memory controller 1220 supporting the random write RW. Referring to FIGS. 1, 3, and 7B together, the storage space SM may include the user area UA, the reserved area RA, and the meta area MA. Each of the user area UA, the reserved area RA, and meta area MA may include a plurality of erase units. Like FIG. 7A, the user area UA may include the plurality of logical units LU1 to LUx, and the random write RW may be performed in the logical units LU1 to LUx. In an example embodiment, "x" may indicate the number of logical units included in the user area UA.

The memory controller 1220 may manage the logical units LU1 to LUx by using the page map table PM. The memory controller 1220 may support a random write for the logical units LU1 to LUx of the random write RW.

In an example embodiment, the memory controller 1220 may store the page map table PM of the logical units LU1 to LUx of the random write RW in the meta area MA. The memory controller 1220 may load and use a portion of the page map table PM of the logical unit LU of the random write RW to the internal buffer 1222.

Examples in which the memory controller 1220 manages the storage space SM are described with reference to FIGS. 7A and 7B, but example embodiments are not limited thereto. In an example embodiment, logical units of the storage space SM may support the zone write ZW or the random write RW. In an example embodiment, the user area UA may include a shared write booster buffer (SWBB) (of a fixed capacity or a variable capacity) additionally allocated or a dedicated write booster buffer (DWBB) (of a fixed capacity or a variable capacity) additionally allocated to be used only in a specific logical unit. In an example embodiment, a type of memory cells of the shared write booster buffer may be an SLC type; in the write operation of the memory device 1210, the shared write booster buffer may be utilized as a space for an SLC backup.

Figure 8:
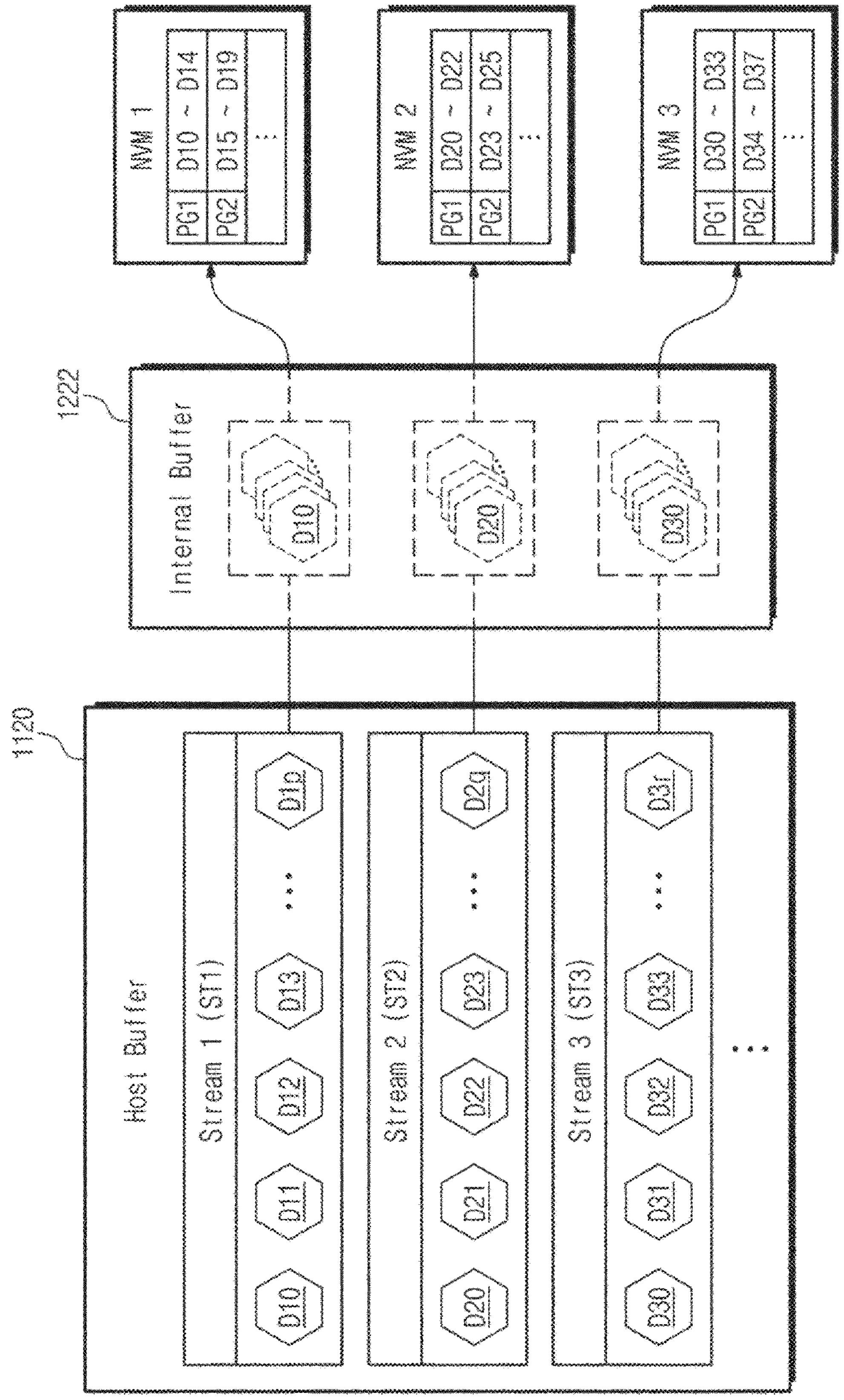
FIG. 8 is a block diagram illustrating an example of a length of data capable of being programmed in a non-volatile memory at a time depending on a stream, according to an example embodiment.

FIG. 8 is a diagram illustrating an example of a data length for each stream, by which data temporarily stored in the host buffer 1120 of FIG. 1 are capable of being written at a time on a memory cell array of a non-volatile memory device, in which data is to be stored, according to an example embodiment. FIG. 8 shows an example of a data transfer length by which data are capable of being written in non-volatile memories NVM1, NVM2, and NVM3 at a time through the internal buffer 1222 without an SLC backup for each stream, partial interleaving, or a manner similar thereto or a combination thereof. The example illustrated and described in FIG. 8 may be based on a data transfer length by which data are written (or programmed) in TLCs of the non-volatile memories NVM1, NVM2, and NVM3.

The non-volatile memories NVM1, NVM2, and NVM3 may correspond to the memory device 1210 of FIG. 1, the memory cell array 1211 of FIG. 2, logical units of FIGS. 7A and 7B, or a zone of FIG. 7A, or a combination thereof. In an example embodiment, each of the non-volatile memories NVM1, NVM2, and NVM3 may store data of the same stream. For example, the first non-volatile memory NVM1 may store the data of the first stream ST1, the second non-volatile memory NVM2 may store the data of the second stream ST2, and the third non-volatile memory NVM3 may store the data of the third stream ST3.

The host buffer 1120 may temporarily store data to be written in the storage device 1200, for each stream. Each of the streams ST1 to ST3 may include a plurality of data fragments. For example, the host buffer 1120 may temporarily store a 10-th data fragment D10 to a 1p-th data fragment D1*p* of the first stream ST1. In FIG. 8, each of "p", "q", and "r" may respectively indicate the number of data fragments included in the streams ST1, ST2, and ST3.

In an example embodiment, the length of the data temporarily stored in the host buffer 1120 may be different from a length capable of being written in the non-volatile memories NVM1, NVM2, and NVM3 at a time for each stream. For example, in the first stream ST1, five data fragments may be written (e.g., TLC-programmed) at a time in the first non-volatile memory NVM1; in the second stream ST2, three data fragments may be written (e.g., MLC-programmed) at a time in the second non-volatile memory NVM2; in the third stream ST3, four data fragments may be written at a time in the third non-volatile memory NVM3. In detail, the 10-th data fragment D10 to the 14-th data fragment D14 may be written in the first non-volatile memory NVM1 at a time in a first program PG1, and the 15-th data fragment D15 to the 19-th data fragment D19 may be written in the first non-volatile memory NVM1 at a time in a second program PG2. That is, lengths of data capable of being written in the non-volatile memories NVM1, NVM2, and NVM3 at a time without a separate technique may be different for respective streams.

The expression "capable of being written at a time" may indicate that data are stored through one program operation to correspond to the cell type of each of the non-volatile memories NVM1, NVM2, and NVM3. For example, when the memory cells included in the first non-volatile memory NVM1 are of a TLC type, three page data of the first stream ST1 may be programmed in the first non-volatile memory NVM1 through one program operation. Likewise, when the memory cells included in the second non-volatile memory NVM2 are of an MLC type, two page data of the second stream ST2 may be programmed in the second non-volatile memory NVM2 through one program operation. The above description is provided as an example, and the cell types of the memory cells included in the non-volatile memories NVM1, NVM2, and NVM3 are not limited to the above examples. For example, the number of pages of data capable of being stored in a non-volatile memory through one program operation may be differently determined for each of the non-volatile memories NVM1, NVM2, and NVM3.

The description is given based on an example embodiment in which the data fragments of each of the streams ST1, ST2, and ST3 are sequentially programmed so as to be written sequentially at a time, but example embodiments are not limited thereto, and according to an example embodiment, data fragments may be programmed sequentially as much as a data transfer length. The example illustrated and described in FIG. 8 may be based on a data transfer length by which data are written (or programmed) in TLCs of the non-volatile memories NVM1, NVM2, and NVM3 at a time, but example embodiments are not limited thereto. According to an example embodiment, memory cells of each of the non-volatile memories NVM1, NVM2, and NVM3 may be of two or more cell types, and according to another example embodiment, the cell types of the non-volatile memories NVM1, NVM2, and NVM3 may be different from each other.

As illustrated and described in FIG. 8, data transfer lengths by which data of the streams ST1, ST2, and ST3 are capable of being programmed in a non-volatile memory at a time (without using a separate technique or the like) may be different. This is due to characteristics of streams. For example, the required performance of the storage device 1200 or the frequency of access by the external device (e.g., the host 1100) may be differently determined for each stream.

Accordingly, when a space of the internal buffer 1222 of FIG. 2, which is capable of temporarily storing data, is insufficient (e.g., in the case of a mobile environment) or when there is a need to improve the write performance or write amplification factor (WAF) of the memory device 1210, for the host 1100 to write data on the memory cell array 1211, in which data intend to be stored, at a time without a separate technique, it may be necessary to know a data transfer length which the memory device 1210 prefers for each stream. Accordingly, the host 1100 may be provided with a data transfer length hint, indicating a data transfer length which the memory device 1210 prefers, for each stream. Below, according to an example embodiment, a method of generating a data transfer length for each stream and a method in which the storage device 1200 transfers the data transfer length hint to the host 1100 will be described with reference to FIGS. 9 to 17.

Figure 9:
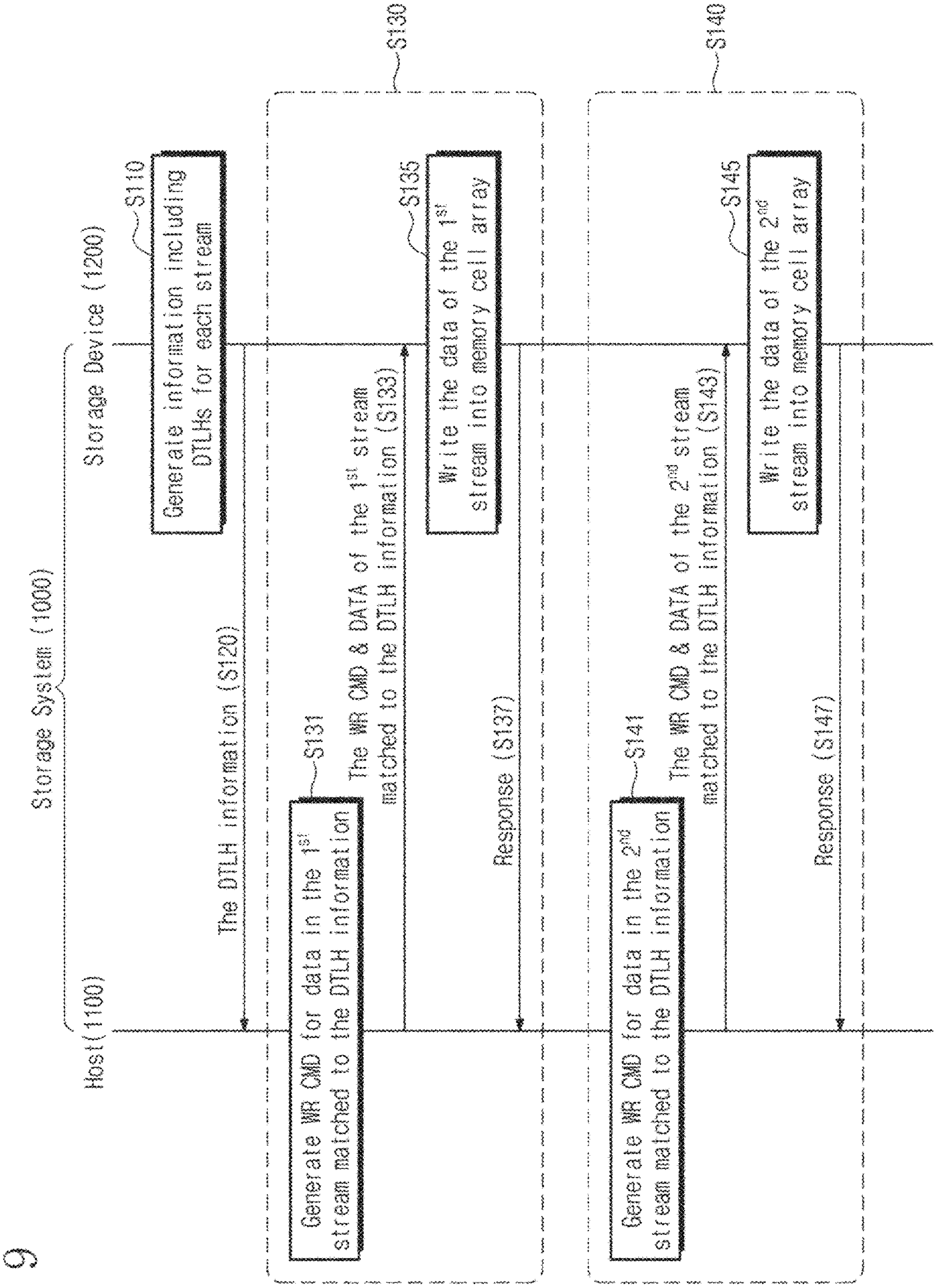
FIG. 9 is a flowchart illustrating a method in which a storage device provides data transfer length hint information to a host, according to an example embodiment.

FIG. 9 is a flowchart illustrating an operation in which the storage device 1200 of FIG. 1 provides data transfer length hint information to the host 1100 of FIG. 1, according to an example embodiment. A method in which the storage device 1200 provides hint information of a data transfer length which the storage device 1200 prefers for each stream and an operation method of the host 1100 which receives the data transfer length hint information will be described with reference to FIGS. 1 to 9. For convenience of description, a first stream and a second stream mentioned through FIG. 9 and the following drawings may indicate two arbitrary streams among the streams ST1 to STk illustrated and described in FIG. 6.

Referring to FIGS. 1 to 9, in operation S110, the storage device 1200 may generate data transfer length hint information. The data transfer length hint information may include one or more data transfer length hints of each of streams (e.g., the streams ST1 to STk of FIG. 6). In an example embodiment, the storage device 1200 may generate one or more data transfer length hints corresponding to each of streams of data. For example, the storage device 1200 may generate one or more first data transfer length hints corresponding to the first stream (e.g., the first stream ST1 of FIGS. 6 and 8) and may generate one or more second data transfer length hints corresponding to the second stream (e.g., the third stream ST3 of FIGS. 6 and 8). Likewise, the storage device 1200 may generate one or more data transfer length hints corresponding to each of the remaining streams.

In an example embodiment, the storage device 1200 may generate the data transfer length hint information through the data transfer length hint generation circuit 100 of the memory controller 1220. An example embodiment in which the storage device 1200 or the data transfer length hint generation circuit 100 generates the data transfer length hint information including one or more data transfer length hints corresponding to each stream will be described in detail with reference to FIG. 10.

In operation S120, the storage device 1200 may send the data transfer length hint information to the host 1100. For example, the data transfer length hint information may include one or more first data transfer length hints corresponding to data of the first stream and one or more data transfer length hints for data of each of second to k-th streams (i.e., second to k-th data transfer length hints of the second to k-th streams). The storage device 1200 may send the generated data transfer length hint information to the host 1100 through (e.g., using) the host interface circuit 1221. In an example embodiment, a plurality of data transfer length hints of a stream, which the data transfer length hint information includes, may be generated in the form of a data transfer length hint pattern.

The host 1100 may receive the data transfer length hint information from the storage device 1200 through the physical layer 1140. The host 1100 may store the data transfer length hint information in an internal memory (e.g., a volatile memory) or register or in the host buffer 1120. The host 1100 may allow the stored data transfer length hint information to be sent to the data transfer manager 1130.

In operation S130, the host 1100 may write the data of the first stream in the storage device 1200. The host 1100 may write the data of the first stream in the storage device 1200, based on the data transfer length hint information received in operation S120. Operation S130 may include operation S131, operation S133, operation S135, and operation S137.

In operation S131, the host 1100 may generate the write command of the data of the first stream, which coincides with the data transfer length hint information. For example, the host 1100 may generate the write command through the data transfer manager 1130. In an example embodiment, the data transfer length included in the write command which the host 1100 generates may correspond to the data transfer length hint information.

In an example embodiment, the host 1100 may manage a data transfer length of data to be sent to the storage device 1200 for each write command, so as to correspond to the data transfer length hint information. For example, referring to FIG. 8 together, when the data transfer length of the first stream ST1 coinciding with the data transfer length hint information corresponds to five data fragments, as illustrated in FIG. 8, the host 1100 may manage the data transfer length of the first stream (or the number of data fragments) such that five data fragments, the data fragments D10 to D14, are sent to the storage device 1200 in a first round, and five data fragments, the data fragments D15 to D19, are sent to the storage device 1200 in a second round.

In an example embodiment, the host 1100 may manage data to be sent to the storage device 1200 through the data transfer manager 1130, so as to correspond to the data transfer length hint. For example, the data transfer manager 1130 may manage data of a stream based on a data transfer length (or the number of data fragments) coinciding with the data transfer length hint of each stream, so as to be sent to the storage device 1200. For another example, the data transfer manager 1130 may issue the write command with the data transfer length coinciding with the data transfer length hint of each stream (e.g., the data transfer length included in the write command may be identical to the data transfer length hint of the stream or may be a multiple of the data transfer length hint). In operation S131, it should be understood that the operations in which the host 1100 generates the write command and manages the data transfer length of the first stream so as to correspond to the data transfer length hint may be performed in an arbitrary order or at the same time.

In operation S133, the host 1100 may send the data of the first stream and the write command for the data of the first stream generated in operation S131 to the storage device 1200. For example, the host 1100 may send a command and data to the storage device 1200 through the physical layer 1140 and the host interface circuit 1221 of the memory controller 1220. In an example embodiment, the host 1100 may send the write command to the storage device 1200 in the format of the write command UPIU. In an example embodiment, the host 1100 may send the data of the first stream to the storage device 1200 in the form of the "DATA-OUT UPIU" in response to the ready-to-transfer (RTT) UPIU. In an example embodiment, the "RTT UPIU" may be the format of a packet which the storage device 1200 sends to request data from the host 1100.

In operation S135, the storage device 1200 may write the data of the first stream in the memory device 1210, based on the received command and data. The storage device 1200 may write the data of the first stream in the memory device 1210 in response to the write command for the data of the first stream. In an example embodiment, the storage device 1200 may temporarily store the data of the first stream (to be written in the storage device 1200) in the internal buffer 1222 and may then send the data of the first stream to the memory device 1210 such that the data of the first stream are written in the memory cell array 1211 at a time.

For convenience of description, operation S133 and operation S135 are described as an example, but example embodiments are not limited thereto. In an example embodiment, the host 1100 may send the data of the first stream to the storage device 1200 through a plurality of "DATA-OUT UPIUs" corresponding to the data transfer length included in the write command. The storage device 1200 may send the "RTT UPIU" requesting a data transfer to the host 1100, and the host 1100 may send the data of the first stream to the storage device 1200 through the "DATA-OUT UPIU" in response to the "RTT UPIU". Until the data of the first stream corresponding to the data transfer length included in the write command are sent to the storage device 1200, the storage device 1200 may repeat operations of sending the "RTT UPIU", receiving the "DATA-OUT UPIU" as a response to the "RTT UPIU", and writing the data. The storage device 1200 may write the data of the "DATA-OUT UPIU" and may then send the "RTT UPIU" for receiving next data to the host 1100.

In an example embodiment, the data transfer length hint information which the host 1100 receives may include one or more data transfer length hints for each stream or may include a data transfer length hint pattern including a plurality of data transfer length hints. For example, when the host 1100 receives one data transfer length hint, the host 1100 may generate the write command to correspond to the one data transfer length hint and may manage the data transfer length by which data are sent to the storage device 1200.

In an example embodiment, when the host 1100 receives a plurality of data transfer length hints or a data transfer length hint pattern including the plurality of data transfer length hints, the host 1100 may generate the write command depending on a given rule, so as to correspond to each of the plurality of data transfer length hints. For example, when the host 1100 receives a plurality of data transfer length hints or a data transfer length hint pattern including the plurality of data transfer length hints, the host 1100 may generate the write command so as to sequentially correspond to the plurality of data transfer length hints, respectively. For another example, when the host 1100 generates the write command depending on all the data transfer length hints so as to comply with the rule defined in the above case, the host 1100 may generate a next write command based on the last data transfer length hint.

In operation S137, the storage device 1200 may transmit the response RES to the host 1100. In an example embodiment, the storage device 1200 may send the response RES to the host 1100 in the form of the response UPIU. Operation S137 will be described in detail with reference to FIG. 12.

Through operation S130, the host 1100 may allow the storage device 1200 to write the data of the first stream at a target location on the memory cell array 1211 of the memory device 1210 at a time without a separate technique such as an SLC backup. In detail, the host 1100 may allow the storage device 1200 to program the data of the first stream to be stored, so as to correspond to a memory cell type (e.g., a TLC type or an MLC type) of the memory cell array 1211 without a separate technique. Operations described in detail in operation S130 are provided as an example, and example embodiments are not limited thereto.

After operation S130, when the host 1100 again intends to write the data of the first stream in the storage device 1200, the storage system 1000 may repeat operation S130. After operation S130, when the host 1100 intends to write data of any other stream other than the first stream in the storage device 1200, the storage system 1000 may proceed to operation S140.

In operation S140, the host 1100 may write the data of the second stream in the storage device 1200. The second stream may be a stream which is included in the streams ST1 to STk of FIG. 6 and is different from the first stream. As in the above description given with reference to operation S130, in operation S140, the data of the second stream may be written in the storage device 1200. Operation S140 may include operation S141, operation S143, operation S145, and operation S147.

In operation S141, the host 1100 may generate the write command of the data of the second stream, which coincides with the data transfer length hint information. For example, the host 1100 may generate the write command through the data transfer manager 1130. In an example embodiment, the data transfer length included in the write command which the host 1100 generates may correspond to the data transfer length hint information. The host 1100 may manage the data transfer length of the data of the second stream to be sent to the storage device 1200 so as to correspond to the data transfer length hint information. In association with the data of the second stream, the operation of the host 1100 in operation S141 may be similar to that in operation S131.

In operation S143, the host 1100 may send the data of the second stream and the write command for the data of the second stream generated in operation S141 to the storage device 1200. For example, the host 1100 may send a command and data to the storage device 1200 through the physical layer 1140 and the host interface circuit 1221 of the memory controller 1220. In an example embodiment, the host 1100 may send the write command to the storage device 1200 in the format of the write command UPIU. In an example embodiment, the host 1100 may send the data of the second stream to the storage device 1200 in the form of the "DATA-OUT UPIU" in response to the "RTT UPIU" which the storage device 1200 sends. In an example embodiment, the data of the second stream may be distributed and sent to the storage device 1200 through a plurality of "DATA-OUT UPIUs".

In operation S145, the storage device 1200 may write the data of the second stream in the memory device 1210, based on the received command and data. The storage device 1200 may write the data of the second stream in the memory device 1210 in response to the write command for the data of the second stream. In an example embodiment, the storage device 1200 may temporarily store the data of the second stream (to be written in the storage device 1200) and may then send the data of the second stream to the memory device 1210 such that the data of the second stream are written in the memory cell array 1211 at a time.

In operation S147, the storage device 1200 may complete the data write of the second stream and may then send the response RES to the host 1100. For example, the storage device 1200 may send the response RES to the host 1100 in the form of the response UPIU.

Like operation S130, the operations described in operation S140 are provided as an example, and example embodiments are not limited thereto. In association with the data of the second stream, operation S143 and operation S145 may be performed to be similar in manner or method to operation S133 and operation S135. Like operation S130, the host 1100 may repeat operation S140 to write all the data of the second stream.

Operation S130 and operation S140 are described as being sequentially performed, but example embodiments are not limited thereto. It should be understood that an example embodiment in which the host 1100 performs operation S130 in association with a portion of the data of the first stream, performs operation S140 in association with a portion of the data of the second stream, and returns to operation S130 to write the data of the first stream is also consistent with the present disclosure.

Through the above operations, the host 1100 may allow the storage device 1200 to write data of each stream directly in the memory cell array 1211 after passing through the internal buffer 1222 without using a separate technique (e.g., an SLC backup or partial interleaving). That is, the host 1100 may allow the storage device 1200 to program data sent to the storage device 1200 at a time so as to correspond to the cell type of the memory cell array 1211. As discussed above, the lifetime of the storage device 1200 may increase as much as the decrement of the number of times of program of the memory cell array 1211, compared to the manner of using the separate technique described above. Also, the performance of the write amplification factor (WAF) may be improved as much as the decrement of the number of times of program required to write one data (as the separate technique described above is not applied). In addition, as the separate technique described above is not applied, the performance of input/output of the memory device 1210 may not be affected. In particular, like the case where the storage system 1000 operates in a mobile environment, when available resources (e.g., capacities of hardware components) are limited, according to an example embodiment, data may be efficiently written on the storage device 1200, and limited available resources may be maximally utilized or may be efficiently utilized. Below, various implementation methods and aspects of example embodiments illustrated and described through FIG. 9 will be described with reference to FIGS. 10 to 17.

Figure 10:
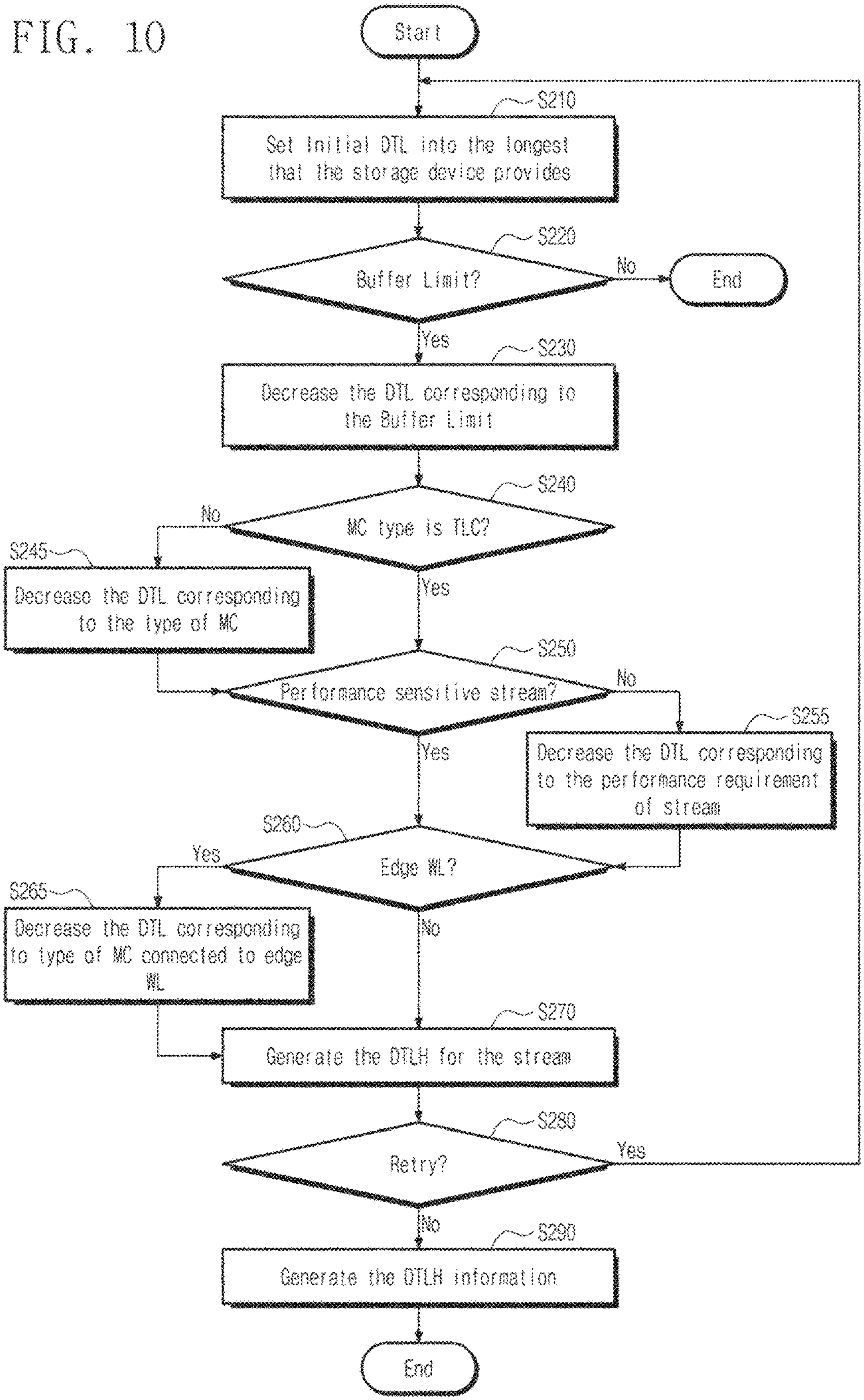
FIG. 10 is a flowchart illustrating a method in which a storage device generates a data transfer length hint, according to an example embodiment.

FIG. 10 is a flowchart illustrating a method in which the storage device 1200 of FIG. 1 generates data transfer length hint information, according to an example embodiment. A data transfer length hint information generating method according to an example embodiment will be described with reference to FIGS. 1 to 10. An example embodiment in which the data transfer length hint generation circuit 100 of FIG. 1 generates data transfer length hint information including one or more data transfer length hints for each stream will be described with reference to FIG. 10, but example embodiments are not limited thereto. For example, it should be understood that operations shown in FIG. 10 may be performed by another component, such as the processor 1223 of FIG. 2, or may be implemented by another component such as the processor 1223 of FIG. 2.

For convenience of description of a data transfer length hint generating process, the description will be given as the data transfer length hint is generated based on the data of the first stream ST1 of FIG. 6. Also, the description will be given as the size of each data fragment of FIG. 6 is 64 KB. It should be understood that one or more data transfer length hints of each stream may be generated by identically or similarly applying operation S210 to operation S270 to be described later to the remaining streams (e.g., the second to k-th streams ST2 to STk of FIG. 6).

In operation S210, the data transfer length hint generation circuit 100 may set an initial data transfer length (DTL). In an example embodiment, the initial DTL which the data transfer length hint generation circuit 100 generates may be a maximum data transfer length which the storage device 1200 is capable of providing. The initial DTL which the data transfer length hint generation circuit 100 generates may be set to be identical or similar to each other depending on streams of data. For example, the data transfer length hint generation circuit 100 may set the initial DTL to 20 data fragments (i.e., 1280 KB).

After performing operation S210, the data transfer length hint generation circuit 100 may proceed to operation S220. In operation S220, the data transfer length hint generation circuit 100 may determine a next procedure depending on whether an available buffer of the storage device 1200 is limited. For example, the data transfer length hint generation circuit 100 may determine a next procedure based on whether there is a limitation on the internal buffer 1222 of FIG. 2 (e.g., whether there is a limitation on the capacity of the internal buffer 1222). When there is no limitation on the available buffer, the data transfer length hint generation circuit 100 may terminate generation of the data transfer length hint information. In this case, the generated data transfer length hint may indicate the maximum data transfer length which the storage device 1200 is capable of receiving. Alternatively, the storage device 1200 may not provide the data transfer length hint information to the host 1100. In contrast, when there is a limitation on the available buffer, the data transfer length hint generation circuit 100 may proceed to operation S230.

In operation S230, the data transfer length hint generation circuit 100 may decrease the data transfer length to correspond to the buffer limit. In an example embodiment, the data transfer length hint generation circuit 100 may identify an available capacity of the internal buffer 1222 of the memory controller 1220, and decrease the data transfer length based on the available capacity of the internal buffer 1222 of the memory controller 1220. For example, the data transfer length hint generation circuit 100 may change (or decrease) the data transfer length (DTL) from 20 data fragments to 12 data fragments (i.e., 768 KB) based on the available capacity of the internal buffer 1222.

In operation S240, the data transfer length hint generation circuit 100 may check a type of a memory cell in which data are to be written. In an example embodiment, the data transfer length hint generation circuit 100 may determine whether a type of a memory cell in which data are to be written is a TLC type. For example, the data transfer length hint generation circuit 100 may check the cell type of the memory cell in which data are to be written, by referring to the page map table PM of FIGS. 7A and 7B associated with a location where data are to be written. When the type of the memory cell is the TLC type, the data transfer length hint generation circuit 100 may proceed to operation S250; when the type of the memory cell is not the TLC type (e.g., is an MLC or SLC type), the data transfer length hint generation circuit 100 may proceed to operation S245. Operation S240 is described based on the example where program states of TLCs provide the densest, but it should be understood that an example embodiment of the storage device 1200 including the memory device 1210 in which program states of memory cells such as QLCs or PLCs are the densest is consistent with the present disclosure. In this case, in operation S240, the data transfer length hint generation circuit 100 may determine whether the type of the memory cell in which data are to be written is a QLC type or a PLC type and may determine a next procedure.

In operation S245, the data transfer length hint generation circuit 100 may decrease the data transfer length (DTL) to correspond to the type of the memory cell. For example, when the memory cell in which data to be written is of the MLC type, the data transfer length hint generation circuit 100 may decrease the data transfer length in operation S240 to a shorter data transfer length. In detail, in operation S245, the data transfer length hint generation circuit 100 may decrease the data transfer length (DTL) of 12 data fragments (i.e., 768 KB) to 6 data fragments (i.e., 384 KB). After operation S245 ends, the data transfer length hint generation circuit 100 may proceed to operation S250.

In operation S250, the data transfer length hint generation circuit 100 may determine whether a stream of data to be written in the memory device 1210 is sensitive to performance. This is because the classification is made based on whether data is sensitive to performance or the frequency of access by an external device, the performance of write (e.g., a time necessary for the write operation) varies depending on a stream. When it is determined in operation S250 that the stream to which the data to be written belong is not sensitive to performance (or that high performance is not required), the data transfer length hint generation circuit 100 may proceed to operation S255. In contrast, when the stream to which the data to be written belong is sensitive to performance, the data transfer length hint generation circuit 100 may proceed to operation S260.

In operation S255, the data transfer length hint generation circuit 100 may decrease the data transfer length (DTL) to correspond to the performance of the stream. For example, when a stream of data to be written in the storage device 1200 is less sensitive to performance (or when required performance is low), the data transfer length hint generation circuit 100 may decrease the data transfer length (DTL). In detail, in operation S255, the data transfer length hint generation circuit 100 may decrease the data transfer length (DTL) of 12 data fragments (i.e., 768 KB) to 8 data fragments (i.e., 512 KB) so as to correspond to the performance of the stream. After operation S255 ends, the data transfer length hint generation circuit 100 may proceed to operation S260.

In operation S260, the data transfer length hint generation circuit 100 may determine whether a wordline controlling memory cells in which data are to be written is an edge wordline. The edge wordline may be a wordline adjacent to the string selection line SSL or the ground selection line GSL (e.g., from among wordlines controlling memory cells where data are to be written). For example, referring to FIG. 4 together, the edge wordline may be the first wordline WL1 or the fourth wordline WL4. In an example embodiment, the data transfer length hint generation circuit 100 may determine whether a wordline of memory cells where data are to be written is an edge wordline, by referring to the page map table PM. When a wordline of memory cells where data are to be written is an edge wordline, the data transfer length hint generation circuit 100 may proceed to operation S265; when a wordline of memory cells where data are to be written is not an edge wordline, the data transfer length hint generation circuit 100 may proceed to operation S270.

In operation S265, the data transfer length hint generation circuit 100 may decrease the data transfer length (DTL) to correspond to a type of memory cells connected to the edge wordline. This is because the type of the memory cells connected to the edge wordline may be different from a type of the remaining memory cells. For example, when a type of memory cells connected to the remaining wordlines other than the edge wordline is the TLC type and the memory cells connected to the edge wordline are MLCs, the data transfer length hint generation circuit 100 may decrease the data transfer length (DTL) to correspond to the cell type. In detail, when the data transfer length (DTL) generated in operation S260 corresponds to 8 data fragments (i.e., 512 KB) and a type of the memory cells connected to the edge wordline is the MLC type, the data transfer length hint generation circuit 100 may decrease the data transfer length (DTL) to correspond to 4 data fragments (i.e., 256 KB).

In operation S270, the data transfer length hint generation circuit 100 may generate a data transfer length hint for a stream. In an example embodiment, the data transfer length hint generation circuit 100 may generate a data transfer length hint for a stream, based on a stream of data, a type of a memory cell where data are to be written, whether a wordline connected to the memory cell where data are to be written is an edge wordline, or a limitation on an internal buffer. For example, the data transfer length hint generation circuit 100 may generate the data transfer length hint for the stream of data, based on the data transfer length (DTL)

generated through operation S210 to operation S265 described above. After operation S270 ends, the data transfer length hint generation circuit 100 may proceed to operation S280.

In operation S280, the data transfer length hint generation circuit 100 may determine whether to generate the data transfer length hint newly (or additionally). In an example embodiment, the data transfer length hint generation circuit 100 may store the data transfer length hint generated through operation S270 in the internal buffer 1222 of the memory controller 1220 or in a memory or register and may then determine whether to generate a new data transfer length hint. In an example embodiment, the data transfer length hint generation circuit 100 may determine whether to generate the data transfer length hint newly (or additionally), based on various factors. For example, the data transfer length hint generation circuit 100 may determine whether to generate the data transfer length hint newly (or additionally), based on whether a data transfer length hint is to be generated in association with any other stream, whether a data transfer length hint pattern including a plurality of data transfer length hints is to be generated in association with the stream whose data transfer length hint is generated, or whether a cell type in which an area (e.g., a zone) of memory cells where data are to be written is managed is changed.

When it is determined that there is a need to generate the data transfer length hint newly (or additionally), the data transfer length hint generation circuit 100 may return to operation S210. When it is determined that there is no need to generate the data transfer length hint newly (or additionally), the data transfer length hint generation circuit 100 may proceed to operation S290.

In operation S290, the data transfer length hint generation circuit 100 may generate data transfer length hint information, based on one or more data transfer length hints of each of one or more streams. For example, the data transfer length hint generation circuit 100 may generate the data transfer length hint information, based on one or more data transfer length hints generated by repeating operation S210 to operation S270 plural times.

The data transfer length hint information may correspond to the data transfer length hint information in operation S120 of FIG. 9. In an example embodiment, the data transfer length hint information may include one or more data transfer length hints of each of one or more streams. In an example embodiment, the data transfer length hint information may include a data transfer length hint pattern corresponding to each of one or more streams and including a plurality of data transfer length hints. For example, in compliance with the sequentiality of the plurality of data transfer length hints included in the data transfer length hint pattern, the host 1100 may generate the write command or may manage a data transfer length of data to be sent to the storage device 1200.

The data transfer length hint generation circuit 100 may generate data transfer length hint information for data of a plurality of streams, based on the process illustrated and described through FIG. 10. The order of plural determination operations illustrated in FIG. 10 is provided as an example, and example embodiments are not limited thereto. For example, it should be understood that operation S240 (including operation S245), operation S250 (including operation S255), or operation S260 (including operation S265) may be performed in an arbitrary order or in an arbitrary combination. It should be understood that an example embodiment not including some of operation S240 (including operation S245), operation S250 (including operation S255), or operation S260 (including operation S265) is also consistent with the present disclosure. Also, an example embodiment in which as the data transfer length hint generation circuit 100 performs the above operations, the data transfer length hint reaches the final data transfer length hint while decreasing the data transfer length hint is described, but example embodiments are not limited thereto. For example, an example embodiment in which the data transfer length hint is set to a minimum data transfer length after operation S220 and the data transfer length is then increased depending on the above operations so as to reach the final data transfer length hint is also consistent with the present disclosure. Based on the data transfer length hint information which the data transfer length hint generation circuit 100 generates depending on the method or manner of FIG. 10, data transferred to the storage device 1200 may be programmed on the memory cell array 1211 while complying with an appropriate data length and required performance, without a separate technique such as an SLC backup.

Figure 11:
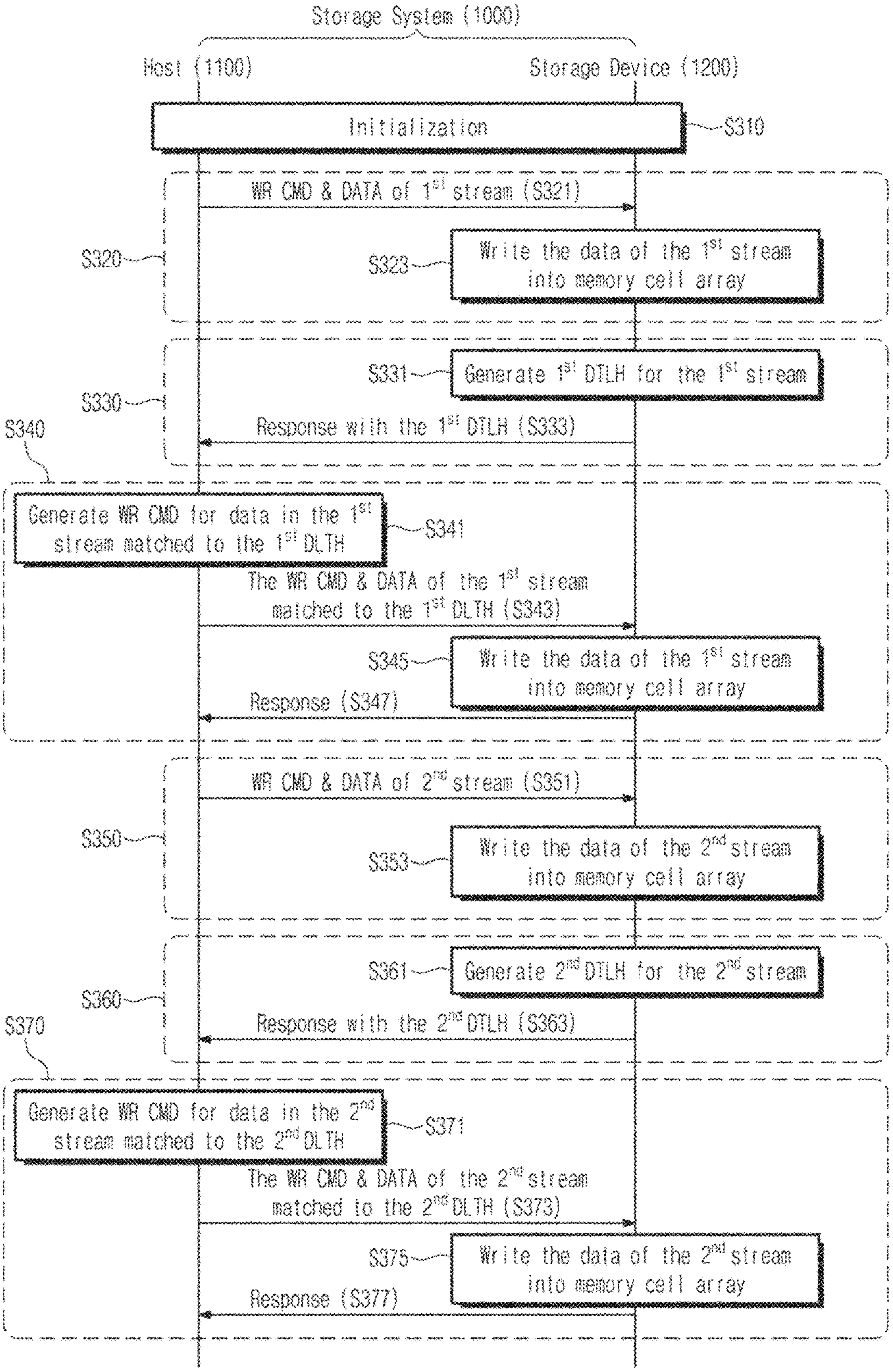
FIG. 11 is a flowchart illustrating an example of a method in which a storage device provides a data transfer length hint to a host, according to an example embodiment.

FIG. 11 is a flowchart illustrating a method in which the storage device 1200 of FIG. 1 sends a data transfer length hint corresponding to each stream to the host 1100, according to an example embodiment. An operation sequence of the host 1100 and the storage device 1200 according to an example embodiment will be described with reference to FIGS. 1 to 11.

In operation S310, the host 1100 and the storage device 1200 may perform an initialization operation. The host 1100 and the storage device 1200 may perform various operations (e.g., a ZQ calibration operation) for performing the write operation and the read operation, based on a given sequence.

In operation S320, the host 1100 may perform an operation of writing the data of the first stream in the storage device 1200. Operation S320 may include operation S321 and operation S323. In operation S321, the host 1100 may send the write command for the data of the first stream and the data. For example, the host 1100 may send a command and data to the storage device 1200 through the physical layer 1140 and the host interface circuit 1221 of the memory controller 1220.

In operation S323, the storage device 1200 may write the received data in the memory cell array 1211, based on the received command. The storage device 1200 may write the data in the memory device 1210 in response to the write command. In an example embodiment, the storage device 1200 may temporarily store the data of the first stream (to be written in the storage device 1200) in the internal buffer 1222 and may then send the data of the first stream to the memory device 1210 such that the data of the first stream are written on the memory cell array 1211.

Operation S321 and operation S323 are provided as an example, and example embodiments are not limited thereto. In an example embodiment, the host 1100 may send the data of the first stream to the storage device 1200 through a plurality of "DATA-OUT UPIUs" corresponding to the data transfer length included in the write command. The storage device 1200 may send the "RTT UPIU" requesting a data transfer to the host 1100, and the host 1100 may send the data of the first stream to the storage device 1200 through the "DATA-OUT UPIU" in response to the "RTT UPIU". Until the data of the first stream are sent to the storage device 1200 corresponding to the data transfer length included in the write command, the storage device 1200 may repeat operations of sending the "RTT UPIU", receiving the "DATA-OUT UPIU" as a response to the "RTT UPIU", and writing the data. In an example embodiment, in operation S321 and operation S323, the storage device 1200 may write the data in the memory device 1210 by using an SLC backup technique.

In operation S330, the storage device 1200 may generate a data transfer length hint for the data of the first stream and may send information about the data transfer length hint to the host 1100. Operation S330 may include operation S331 and operation S333.

In operation S331, the storage device 1200 may generate one or more first data transfer length hints for the first stream. In an example embodiment, the storage device 1200 may generate one or more first data transfer length hints through the data transfer length hint generation circuit 100 of the memory controller 1220. The storage device 1200 may generate one or more first data transfer length hints for the first stream, based on the data transfer length hint generating method described with reference to FIGS. 9 and 10. In an example embodiment, the storage device 1200 may generate a first data transfer length hint pattern including a plurality of first data transfer length hints for the first stream.

In operation S333, the storage device 1200 may send the response RES, to the host 1100, indicating the completion of the first stream data write operation together with the one or more first data transfer length hints (or the first data transfer length hint pattern) generated in operation S331. For example, the storage device 1200 may send the response UPIU including the one or more first data transfer length hints (or the first data transfer length hint pattern) to the host 1100. An example of the response in operation S333 will be described in detail with reference to FIG. 13.

The description is given with reference to FIG. 11 as operation S320 and operation S330 are independent of each other and are sequentially performed, but this is provided as an example. For example, example embodiments are not limited thereto. It should be understood that an example embodiment in which operation S320 and operation S330 partially overlap each other is also consistent with the present disclosure.

In operation S340, the host 1100 may write the data of the first stream in the storage device 1200 to correspond to the one or more first data transfer length hints (or the first data transfer length hint pattern). Operation S340 may include operation S341, operation S343, operation S345, and operation S347. Operation S340 may be the same as or similar to operation S130 of FIG. 9.

In operation S341, the host 1100 may generate the write command for the data of the first stream to correspond to the one or more first data transfer length hints (or the first data transfer length hint pattern). In an example embodiment, the host 1100 may manage the data transfer length(s) of the data of the first stream to be written in the storage device 1200 to correspond to the one or more first data transfer length hints. The host 1100 may perform operation S341 to be the same as or similar to operation S131 or operation S134 of FIG. 9.

In operation S343, the host 1100 may send the write command in operation S341 and the data of the first stream to the storage device 1200 to correspond to the one or more first data transfer length hints (or the first data transfer length hint pattern). In operation S345, the storage device 1200 may write the data of the first stream in the memory device 1210, based on the received command and data. The storage device 1200 may write the data of the first stream in the memory device 1210 in response to the write command for the data of the first stream. Operation S343 and operation S345 may be performed to be the same as or similar to operation S133 and operation S135 of FIG. 9 or operation S143 and operation S145 of FIG. 9.

In operation S347, the storage device 1200 may send the response RES indicating that the data of the first stream are completely written in the memory device 1210 to the host 1100. For example, the storage device 1200 may send the response UPIU to the host 1100 to provide notification that the data of the first stream are completely written in the memory device 1210. The response in operation S347 will be described in detail with reference to FIG. 12.

In operation S350, the host 1100 may write the data of the second stream in the storage device 1200. The second stream may be different from the first stream. Operation S350 may include operation S351 and operation S353. Operation S350 may be performed to be the same as or similar to operation S320.

In operation S351, the host 1100 may send the write command for the data of the second stream and the data to the storage device 1200. For example, the host 1100 may send the write command for the data of the second stream and the data to the storage device 1200 through the physical layer 1140 and the host interface circuit 1221 of the memory controller 1220.

In operation S353, the storage device 1200 may write the received data of the second stream in the memory cell array 1211, based on the received command. The storage device 1200 may write the data of the second stream in the memory device 1210 in response to the write command for the data of the second stream. In an example embodiment, the storage device 1200 may temporarily store the data of the second stream (to be written in the storage device 1200) in the internal buffer 1222 and may then send the data of the second stream to the memory device 1210 such that the data of the second stream are written on the memory cell array 1211. In association with the data of the second stream, operation S351 and operation S353 may be performed to be the same as similar to operation S321 and operation S323.

In operation S360, the storage device 1200 may generate a second data transfer length hint for the data of the second stream and may send the second data transfer length hint to the host 1100. Operation S360 may include operation S361 and operation S363.

In operation S361, the storage device 1200 may generate a second data transfer length hint for the second stream. In an example embodiment, the storage device 1200 may generate one or more second data transfer length hints through the data transfer length hint generation circuit 100 of the memory controller 1220. The storage device 1200 may generate the second data transfer length hint for the second stream, based on the data transfer length hint generating method described with reference to FIGS. 9 and 10. In an example embodiment, the data transfer length hint generation circuit 100 may generate a second data transfer length hint pattern including a plurality of second data transfer length hints of the second stream.

In operation S363, the storage device 1200 may send the response RES indicating the completion of the second stream data write operation together with the one or more second data transfer length hints (or the second data transfer length hint pattern) to the host 1100. For example, the storage device 1200 may send the response UPIU including the one or more second data transfer length hints (or the second data transfer length hint pattern) to the host 1100. An example of the response RES in operation S363 will be described in detail with reference to FIG. 13.

In operation S370, the host 1100 may write the data of the second stream in the storage device 1200 to correspond to the one or more second data transfer length hints (or the second data transfer length hint pattern). Operation S370 may include operation S371, operation S373, operation S375, and operation S377. Operation S370 may be performed to be the same as or similar to operation S130 or operation S140 of FIG. 9 or operation S340.

In operation S371, the host 1100 may generate the write command for the data of the second stream to correspond to the second data transfer length hint. In an example embodiment, the host 1100 may manage the data transfer length of the data of the second stream to be written in the storage device 1200 to correspond to the one or more second data transfer length hints (or the second data transfer length hint pattern). The host 1100 may perform operation S371 to be the same as or similar to operation S131 of FIG. 9, operation S141 FIG. 9, or operation S341.

In operation S373, the host 1100 may send the write command in operation S371 and the data of the second stream to correspond to the one or more second data transfer length hints (or the second data transfer length hint pattern). In operation S375, the storage device 1200 may write the data of the second stream in the memory device 1210, based on the received command and data. The storage device 1200 may write the data of the second stream in the memory device 1210 in response to the write command for the data of the second stream. Operation S373 and operation S375 may be performed to be the same as or similar to operation S133 and operation S135 of FIG. 9, operation S143 and operation S145 of FIG. 9, or operation S343 and operation S345.

In operation S377, the storage device 1200 may send the response RES indicating that the data of the second stream are completely written in the memory device 1210 to the host 1100. For example, the storage device 1200 may send the response UPIU to the host 1100 to provide notification that the data of the second stream are completely written in the storage device 1200. The response in operation S377 will be described in detail with reference to FIG. 12.

FIG. 11 shows a method in which when the host 1100 does not know a data transfer length of data for each stream, the host 1100 receives a data transfer length hint for each stream and performs a data write based on the data transfer length hint. The procedure of operation S320 to operation S370 illustrated and described in FIG. 11 is provided as an example, and example embodiments are not limited thereto. For example, it should be understood that an example embodiment in which operation S320 to operation S340 are performed after operation S350 to operation S370 are performed or an example embodiment in which operation S340 or operation S370 is performed after operation S320, operation S330, operation S350, and operation S360 are sequentially performed is also consistent with the present disclosure.

Figure 12:
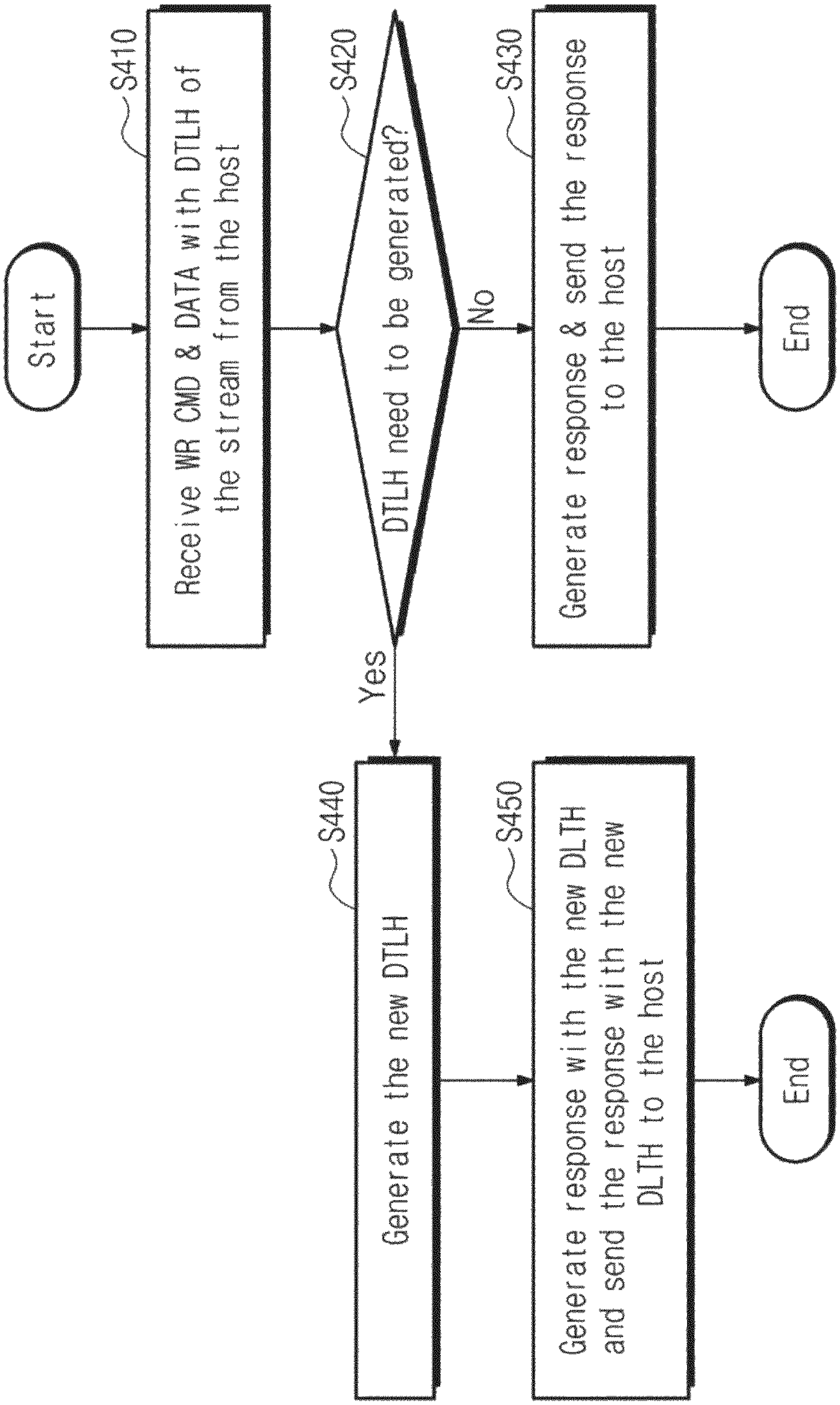
FIG. 12 is a flowchart illustrating a method in which a storage device generates a response, according to an example embodiment.

FIG. 12 is a flowchart illustrating a process in which the storage device 1200 generates a response of FIG. 11, according to an example embodiment. A process in which a response in operation S347 or operation S377 of FIG. 11 is generated will be described with reference to FIGS. 1 to 12.

In operation S410, the storage device 1200 may determine whether there is a need to generate a new data transfer length hint. In an example embodiment, the storage device 1200 may determine whether there is a need to generate a new data transfer length hint for each stream. For example, the storage device 1200 may determine whether there is a need to generate a new first data transfer length hint for the data of the first stream or whether there is a need to generate a new second data transfer length hint for the data of the second stream.

In an example embodiment, the storage device 1200 may determine whether there is a need to generate a new data transfer length hint, through the data transfer length hint generation circuit 100. For example, the storage device 1200 may determine whether there is a need to generate a new first data transfer length hint or a new second data transfer length hint, through the data transfer length hint generation circuit 100. The storage device 1200 may determine whether there is a need to generate a new data transfer length hint, based on various factors. For example, the storage device 1200 may determine whether there is a need to generate a new data transfer length hint for each stream, based on whether a type of a memory cell where data are to be written changes (i.e., whether a type of a next memory cell is different than a type of a current memory cell), whether an available capacity of the internal buffer 1222 changes, etc. In detail, the storage device 1200 may determine whether there is a need to generate a new data transfer length hint for each stream, by referring to the page map table PM of FIGS. 7A and 7B.

In operation S420, the storage device 1200 may determine a next procedure, based on whether a data transfer length hint is to be newly generated. When there is no need to newly generate a data transfer length hint, the storage device 1200 may proceed to operation S430. In contrast, when there is a need to newly generate a data transfer length hint, the storage device 1200 may proceed to operation S440.

In operation S430, the storage device 1200 may generate the response RES without generating a new data transfer length hint and may send the response RES to the host 1100. For example, the storage device 1200 may generate the response UPIU indicating that the write operation for the data of the stream is completed without a new data transfer length hint and may send the response UPIU to the host 1100.

In operation S440, the storage device 1200 may generate a new data transfer length hint. For example, referring to FIG. 11 together, the storage device 1200 may generate a new first data transfer length hint for the first stream or may generate a new second data transfer length hint for the second stream. In an example embodiment, the storage device 1200 may generate a new data transfer length hint through the data transfer length hint generation circuit 100. For example, the storage device 1200 may generate a new data transfer length hint for the data of the stream, based on the method or manner illustrated and described through FIGS. 9 and 10.

In operation S450, the storage device 1200 may generate the response RES including the new data transfer length hint and may send the response RES to the host 1100. For example, the storage device 1200 may send the response UPIU, which includes the new data transfer length hint for the data of the stream and indicates that the write operation for the data of the stream is completed, to the host 1100.

Operation S410 to operation S450 illustrated and described in FIG. 12 may be performed in operation S347 or operation S377 of FIG. 11. However, example embodiments are not limited thereto. For example, it should be understood that an example embodiment in which operation S410, operation S420, and operation S440 of FIG. 12 are performed simultaneously with operation S343 and operation S345 in the case of the data of the first stream is also consistent with the present disclosure. For another example, it should be understood that an example embodiment in which operation S410, operation S420, and operation S440 of FIG. 12 are performed simultaneously with operation S373 and operation S375 in the case of the data of the second stream is also consistent with the present disclosure. Also, FIG. 12 is described based on an example in which a first data transfer length hint or a second data transfer length hint is newly generated, but it should be understood that an example embodiment in which one or more first data transfer length hints, one or more second data transfer length hints, a first data transfer length hint pattern, or a second data transfer length hint pattern is newly generated is also consistent with the present disclosure.

Figure 15:
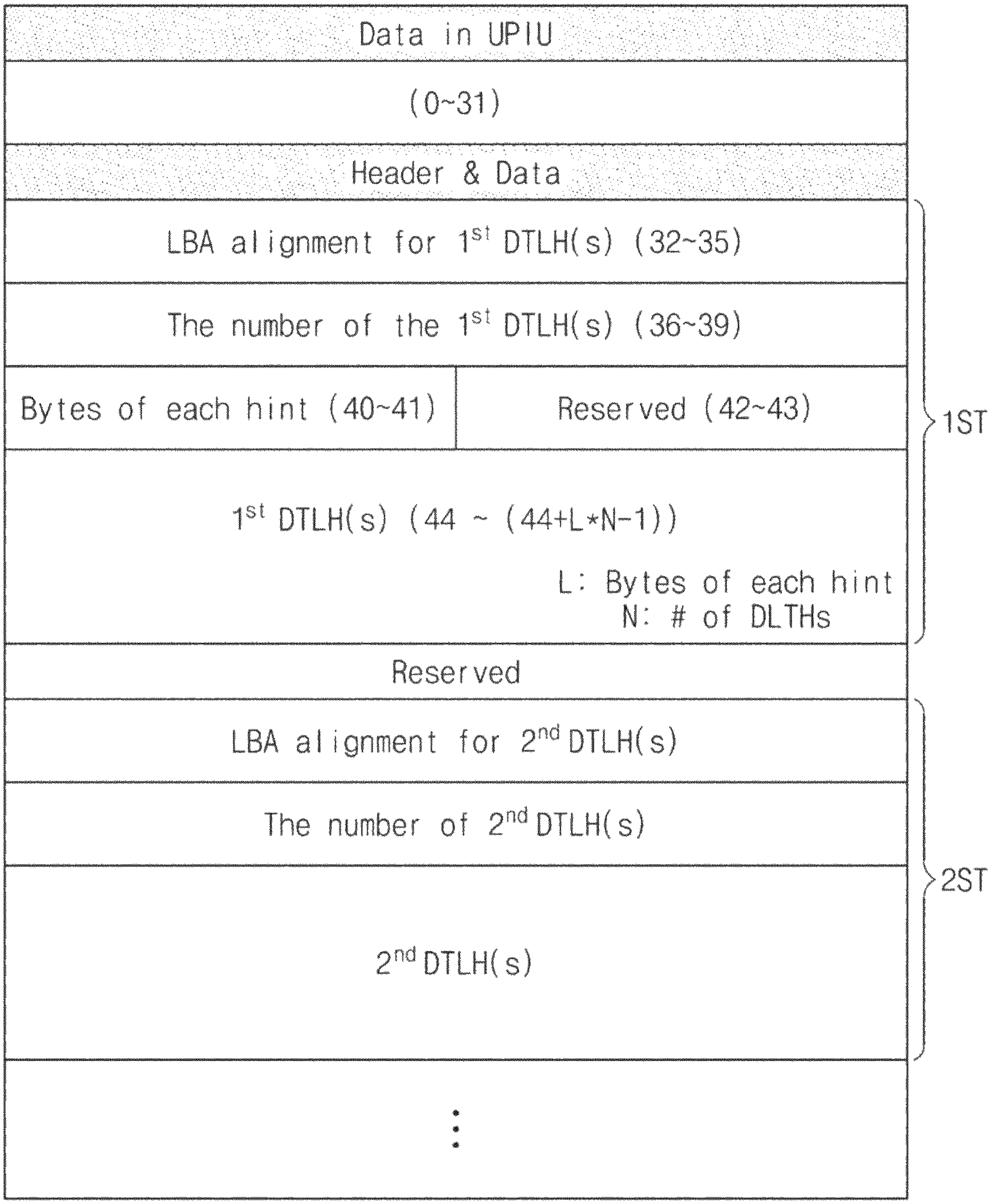
FIG. 15 is a diagram illustrating an example of a "DATA-IN UPIU", according to an example embodiment.
Figure 17:
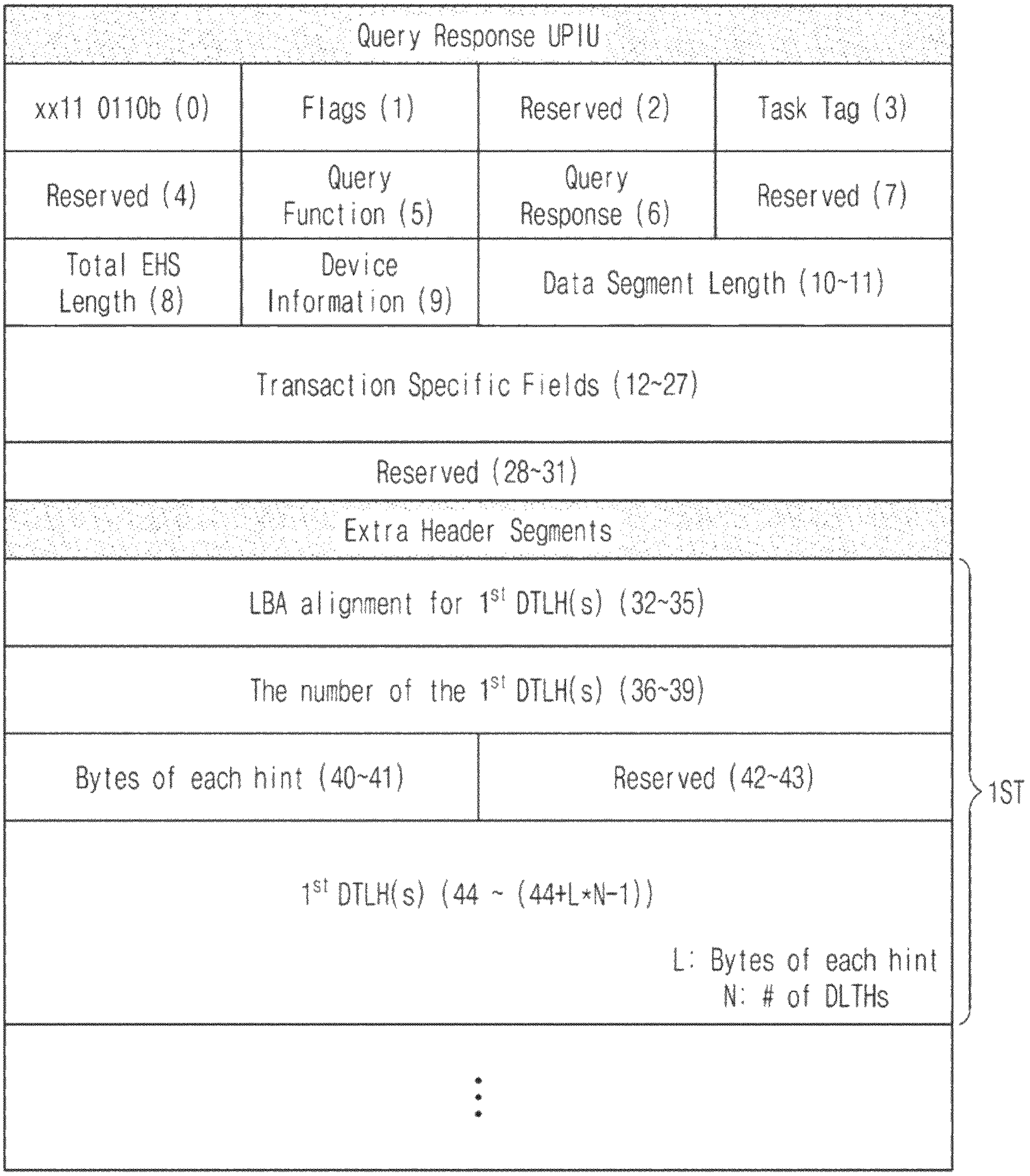
FIG. 17 is a diagram illustrating an example of a query response UPIU, according to an example embodiment.

FIG. 13 is a diagram illustrating the response UPIU according to an example embodiment. In an example embodiment, the response UPIU of FIG. 13 may be applied to the storage device 1200 supporting the management of the storage space SM of FIG. 7A. In FIGS. 13, 15, and 17, numerical values in parentheses may indicate byte numbers. An example of the response UPIU including a data transfer length hint according to an example embodiment will be described with reference to FIGS. 1 to 13.

Referring to FIG. 13, the response UPIU may include an area from byte 0 to byte 31 and an extra header segments (EHS) area after byte 32. A basic header area from byte 0 to byte 11 may indicate a transaction kind, flags, a command set type, etc. A residual transfer count area from byte 12 to byte 15 may be used as an area for indicating additional information depending on specific flags included in the basic header area from byte 0 to byte 11. A reserved area from byte 16 to byte 31 which is an area in which data are not included may be an area in which an arbitrary value is capable of being included without limitation.

The EHS area from byte 32 may indicate data transfer length hint information of a stream of data targeted for the response UPIU. An area from byte 32 to byte 35 may indicate a point in time to start command generation and transfer data management depending on a data transfer length hint which the host 1100 receives. In an example embodiment, in the response UPIU, the area from byte 32 to byte 35 may indicate a logical address LBA (or a logical block address) at which the write command generation and the transfer data management according to the data transfer length hint starts. This is because, in the case of the storage device 1200 with the storage space SM of FIG. 7A, a logical address is mapped to a physical address of a memory cell, in which data are to be written, through the multi-level map table MM and a sequential write is performed depending on a zone-based management characteristic.

An area from byte 36 to byte 39 may indicate the number of data transfer length hints. In an example embodiment, whether the response UPIU includes only one data transfer length hint, whether the response UPIU includes a plurality of data transfer length hints, or whether the response UPIU includes a data transfer length hint pattern including a plurality of data transfer length hints may be indicated through the area from byte 36 to byte 39. An area from byte 40 to byte 41 may indicate the number of data transfer length hints. For example, the data transfer length hints included in the response UPIU may include the same number of bytes, and the response UPIU may indicate the number of bytes of each data transfer length hint included in the response UPIU through the area from byte 40 to byte 41.

An area from byte 42 to byte 43 may be a reserved area. An area from byte 44 to byte (44+L*N+1) may indicate one or more data transfer length hints for a stream. Herein, "L" may represent the number of data transfer length hints included in the response UPIU indicated through the area from byte 40 to byte 41, and "N" may represent the number of bytes of each data transfer length hint indicated through the area from byte 36 to byte 39. For example, the host 1100 which receives the response UPIU including a data transfer length hint included in an area after byte 44 may sequentially set data transfer lengths to correspond to data transfer length hints after a byte-44 area. In an example embodiment, the data transfer length hints after the byte-44 area may be generated depending on the method described with reference to FIGS. 9 and 10.

The response UPIU described with reference to FIG. 13 may correspond to an example embodiment in which the storage device 1200 managing the storage space SM of FIG. 7A generates the response UPIU, but example embodiments are not limited thereto. It should be understood that an example embodiment in which, even in the case of managing the storage space SM of FIG. 7B, the storage device 1200 provides the response UPIU including one or more data transfer length hints, based on the page map table PM, in association with the write command generation or the stream data transfer of the host 1100 is also consistent with the present disclosure. The response UPIU including one or more data transfer length hints described through FIG. 13 is provided as an example, and example embodiments are not limited thereto. It should be understood that an example embodiment in which plural information or data illustrated and described through FIG. 13 are included in the reserved area from byte 16 to byte 31 or an example embodiment in which each information or data is disposed in an arbitrary byte area is also consistent with the present disclosure.

Figure 14:
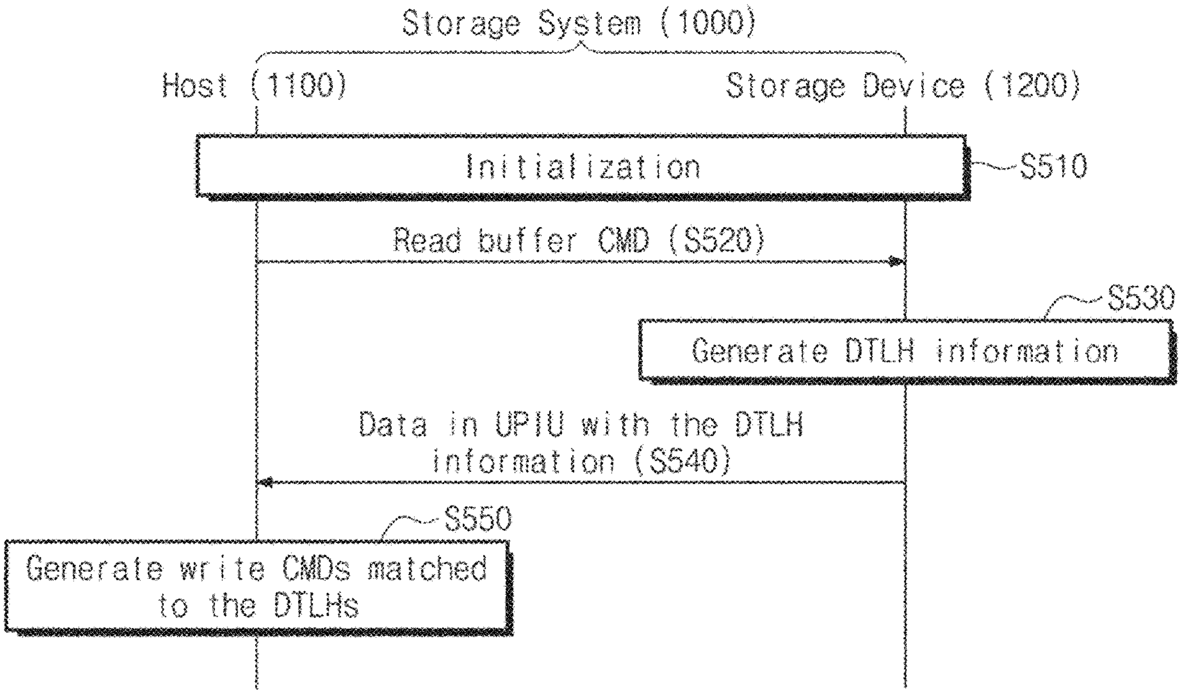
FIG. 14 is a flowchart illustrating an example of a method in which a storage device provides data transfer length hint information to a host, according to an example embodiment.

FIG. 14 is a flowchart illustrating a process in which the storage device 1200 sends data transfer length hint information for each stream of data to the host 1100, according to an example embodiment. According to an example embodiment, how the storage device 1200 sends a data transfer length hint will be described with reference to FIGS. 1 to 10 and 14.

In operation S510, the host 1100 and the storage device 1200 may perform an initialization operation. The host 1100 and the storage device 1200 may perform the initialization operation to be the same as or similar to that in operation S130 of FIG. 13.

In operation S520, the host 1100 may send a read buffer command. In an example embodiment, the host 1100 may send the read buffer command to the storage device 1200 through the physical layer 1140 in the form of the command UPIU. The above read buffer command is provided as an example, and it should be understood that an example embodiment in which there is used an arbitrary command capable of receiving the "DATA-IN UPIU" as a response from the storage device 1200 is also consistent with the present disclosure.

In operation S530, the storage device 1200 may generate data transfer length hint information of data. The data transfer length hint information may include one or more data transfer length hints for each stream (or a data transfer length hint pattern for each stream). The storage device 1200 may generate the data transfer length hint information by generating one or more data transfer length hints for each stream of data in a manner or method similar to the manner or method described with reference to FIGS. 9 and 10.

In operation S540, the storage device 1200 may send the "DATA-IN UPIU" including one or more data transfer length hints for each stream to the host 1100. The host 1100 may store the one or more data transfer length hints for each stream received through the "DATA-IN UPIU" in the host buffer 1120 or in a memory or registers. The "DATA-IN UPIU" which the storage device 1200 generates will be described in detail with reference to FIG. 15.

In operation S550, the host 1100 may generate the write command to correspond to the data transfer length hint of each stream and may manage the data transfer length for each stream to correspond to the data transfer length hint. Operation S550 may be performed to be the same as or similar to operation S131 or operation S141 of FIG. 9 or operation S341 or operation S371 of FIG. 11. After operation S550, the host 1100 and the storage device 1200 may operate to be the same as or similar to those in operation S130 or operation S140 of FIG. 9 or operation S340 or operation S370 of FIG. 11.

In contrast to FIG. 10, FIG. 14 shows an operation of generating a data transfer length hint for each stream at a fixed time and sending the data transfer length hint to the host 1100, not an operation of generating a data transfer length hint for each stream at a run time. In FIG. 14, the storage device 1200 may send a data transfer length hint, for each stream, to the host 1100 before receiving the write command, and the host 1100 may generate the write command based on the data transfer length hints. It should be understood that an example embodiment in which the manners of FIGS. 10 and 14 are combined is also consistent with the present disclosure. For example, it should be understood that an example embodiment in which operation S340 or operation S370 of FIG. 10 is performed after operation S510 to operation S540 of FIG. 14 are performed is also consistent with the present disclosure.

FIG. 15 is a diagram illustrating the "DATA-IN UPIU" of FIG. 14, according to an example embodiment. An example of the "DATA-IN UPIU" described with reference to FIG. 14 will be described with reference to FIGS. 1 to 10, 14, and 15.

The "DATA-IN UPIU" may include a plurality of information through an area from byte 0 to byte 31. For example, the "DATA-IN UPIU" may include a plurality of information such as a transaction kind (e.g., a response of a read buffer command), flags, or a data segment length.

In the "DATA-IN UPIU", an area after byte 32 may indicate data transfer length hint information for each stream. In an example embodiment, the area after byte 32 may sequentially indicate data transfer length hint information for respective streams. For example, referring to FIG. 6 together, the area after byte 32 may indicate one or more first data transfer length hints for the first stream 1ST, one or more second data transfer length hints for the second stream 2ST, . . . , one or more k-th data transfer length hints for the k-th stream. The form of the data transfer length hint information of each stream may be the same as or similar to that of a part corresponding to the EHS area illustrated and described through FIG. 13.

The structure of the "DATA-IN UPIU" illustrated and described through FIG. 15 is provided as an example, and example embodiments are not limited thereto. It should be understood that an example embodiment in which multiple information or data illustrated and described through FIG. 15 are included in an arbitrary form or data structure or at a location on an arbitrary byte area is also consistent with the present disclosure.

Figure 16:
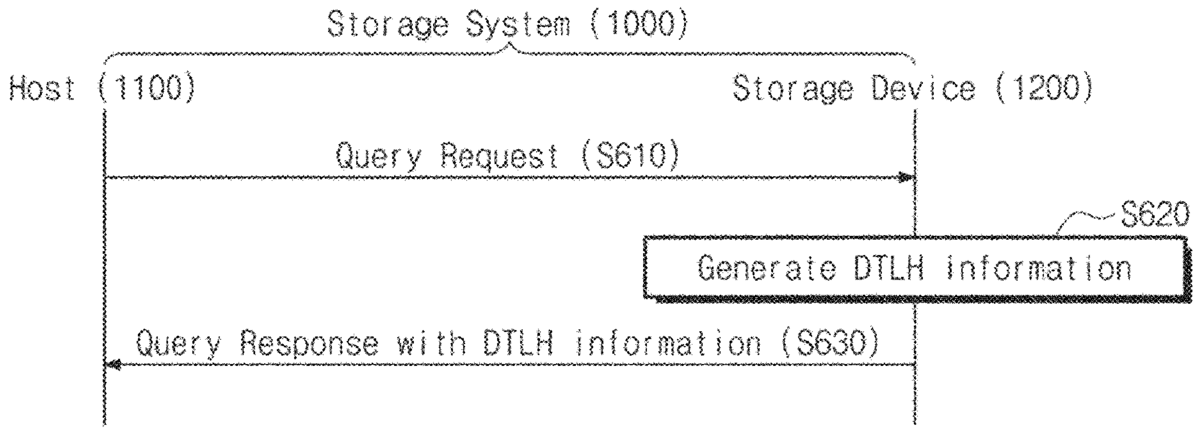
FIG. 16 is a flowchart illustrating an example of a method in which a storage device provides data transfer length hint information to a host, according to an example embodiment.

FIG. 16 is a flowchart illustrating a method in which the storage device 1200 sends data transfer length hint information for each stream to the host 1100, according to an example embodiment. According to an example embodiment, a process and a method in which the storage device 1200 sends data transfer length hint information for each stream to the host 1100 will be described with reference to FIGS. 1 to 10 and 16.

In operation S610, the host 1100 may send a query request command to the storage device 1200. The query request command may be a command which is used for a data transfer between an initiator device and a target device of a standard user data transfer. In an example embodiment, the host 1100 may send the query request command to the storage device 1200 in the form of the query request UPIU. For example, the host 1100 may send the query request command to the storage device 1200 through the physical layer 1140 in the form of the command UPIU.

In operation S620, the storage device 1200 may generate data transfer length hint information of data. The data transfer length hint information may include one or more data transfer length hints for each stream. The storage device 1200 may generate the data transfer length hint information by generating one or more data transfer length hints for each stream of data in a manner or method similar to the manner or method described with reference to FIGS. 9 and 10.

In operation S630, the storage device 1200 may send a query response including the data transfer length hint information to the host 1100. In an example embodiment, the storage device 1200 may send the query response including the data transfer length hint information to the host 1100 in the form of the query response UPIU. The response RES which the storage device 1200 sends to the host 1100 will be described with reference to FIG. 17.

After operation S630, the host 1100 may generate the write command to correspond to the data transfer length hint information and may manage the transfer length of data to be sent to the storage device 1200 to correspond to the data transfer length hint information for each stream. For example, after operation S630, the host 1100 and the storage device 1200 may operate to be the same as or similar to those in operation S130 or operation S140 of FIG. 9 or operation S340 or operation S370 of FIG. 11.

FIG. 17 is a diagram illustrating an example of a query response UPIU of FIG. 16, according to an example embodiment. An example of the query response UPIU according to an example embodiment will be described with reference to FIGS. 1 to 10, 16, and 17.

Referring to FIG. 17, the query response UPIU may include a plurality of information through an area from byte 0 to byte 31. For example, the byte-0 area may represent a transaction kind, the area from byte 10 to byte 11 may represent a data segment length. In the query response UPIU, an area after byte 32 may be an extra header segments (EHS) area.

In an example embodiment, the EHS area of the query response UPIU may indicate data transfer length hint information. For example, the EHS area of the query response UPIU may indicate a first data transfer length hint(s) for the first stream and a second data transfer length hint(s) for the second stream. The form in which the query response UPIU indicate data transfer length hint information may be the same as or similar to that illustrated and described through the EHS area of FIG. 13 or the header & data area of FIG. 15. The illustration and description of the EHS area of FIG. 17 are provided as an example, and example embodiments are not limited thereto. It should be understood that the data illustrated and described through FIG. 17 may be included in the query response UPIU based on an arbitrary arrangement, an arbitrary data structure, or an arbitrary byte area arrangement.

The operation of the storage system 1000 is independently described with reference to FIGS. 9 to 12, 14, and 16, but example embodiments are not limited thereto. The storage system 1000 may perform an example embodiment in which the methods of FIGS. 9 to 12, 14, and 16 are individually performed or the methods of FIGS. 9 to 12, 14, and 16 are arbitrarily combined.

Figure 18:
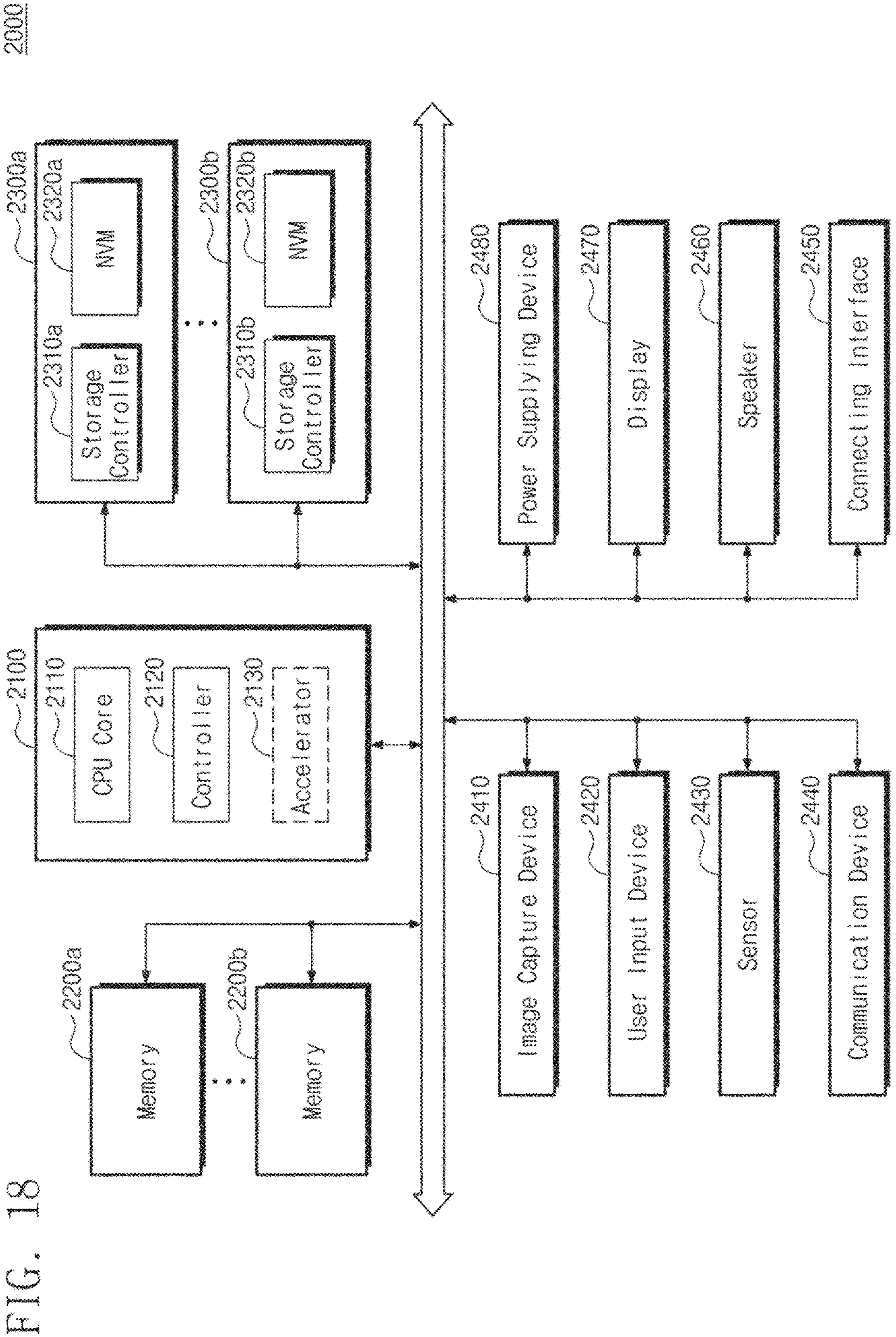
FIG. 18 is a block diagram illustrating an electronic system, according to an example embodiment.

FIG. 18 is a diagram of a system 2000 to which a storage device is applied, according to an example embodiment. The system 2000 of FIG. 18 may be a mobile system, such as a portable communication terminal (e.g., a mobile phone), a smartphone, a tablet personal computer (PC), a wearable device, a healthcare device, or an Internet of things (IoT) device. However, the system 2000 of FIG. 18 is not necessarily limited to the mobile system and may be a PC, a laptop computer, a server, a media player, or an automotive device (e.g., a navigation device).

Referring to FIG. 18, the system 2000 may include a main processor 2100, memories (e.g., 2200*a* and 2200*b*), and storage devices (e.g., 2300*a* and 2300*b*). In addition, the system 2000 may include at least one of an image capturing device 2410, a user input device 2420, a sensor 2430, a communication device 2440, a connecting interface 2450, a speaker 2460, a display 2470, and a power supplying device 2480.

The main processor 2100 may control all operations of the system 2000, more specifically, operations of other components included in the system 2000. The main processor 2100 may be implemented as a general-purpose processor, a dedicated processor, or an application processor.

The main processor 2100 may include at least one CPU core 2110 and further include a controller 2220 configured to control the memories 2200*a* and 2200*b* and/or the storage devices 2300*a* and 2300*b*. In some example embodiments, the main processor 2100 may further include an accelerator 2230, which is a dedicated circuit for a high-speed data operation, such as an artificial intelligence (AI) data operation. The accelerator 2230 may include a graphics processing unit (GPU), a neural processing unit (NPU) and/or a data processing unit (DPU) and be implemented as a chip that is physically separate from the other components of the main processor 2100. The main processor 2100 may be or include the host 1100 in FIGS. 1 to 17.

The memories 2200*a* and 2200*b* may be used as main memory devices of the system 2000. Although each of the memories 2200*a* and 2200*b* may include a volatile memory, such as static random access memory (SRAM) and/or dynamic RAM (DRAM), each of the memories 2200*a* and 2200*b* may include non-volatile memory, such as a flash memory, phase-change RAM (PRAM) and/or resistive RAM (RRAM). The memories 2200*a* and 2200*b* may be implemented in the same package as the main processor 2100.

The storage devices 2300*a* and 2300*b* may serve as non-volatile storage devices configured to store data regardless of whether power is supplied thereto, and have larger storage capacity than the memories 2200*a* and 2200*b*. The storage devices 2300*a* and 2300*b* may respectively include storage controllers (STRG CTRL) 2310*a* and 2310*b* and NVM (Non-Volatile Memory) s 2320*a* and 2320*b* configured to store data via the control of the storage controllers 2310*a* and 2310*b*. Although the NVMs 2320*a* and 2320*b* may include flash memories having a two-dimensional (2D) structure or a three-dimensional (3D) V-NAND structure, the NVMs 2320*a* and 2320*b* may include other types of NVMs, such as PRAM and/or RRAM.

The storage devices 2300*a* and 2300*b* may be physically separated from the main processor 2100 and included in the system 2000 or implemented in the same package as the main processor 2100. In addition, the storage devices 2300*a* and 2300*b* may have types of solid-state devices (SSDs) or memory cards and be removably combined with other components of the system 2000 through an interface, such as the connecting interface 2450 that will be described below. The storage devices 2300*a* and 2300*b* may be devices to which a standard protocol, such as a universal flash storage (UFS), an embedded multi-media card (eMMC), or a non-volatile memory express (NVMe), is applied, without being limited thereto.

The storage devices 2300*a* and 2300*b* may be or include the storage device 1200 in FIGS. 1 to 17. The storage controller 2310*a* and 2310*b* may be or include the memory controller 1220 in FIGS. 1 to 17. The NVMs 2320*a* and 2320*b* may be or include the memory device 1210 in FIGS. 1 to 17.

The image capturing device 2410 may capture still images or moving images. The image capturing device 2410 may include a camera, a camcorder, and/or a webcam.

The user input device 2420 may receive various types of data input by a user of the system 2000 and include a touch pad, a keypad, a keyboard, a mouse, and/or a microphone.

The sensor 2430 may detect various types of physical quantities, which may be obtained from the outside of the system 2000, and convert the detected physical quantities into electric signals. The sensor 2430 may include a temperature sensor, a pressure sensor, an illuminance sensor, a position sensor, an acceleration sensor, a biosensor, and/or a gyroscope sensor.

The communication device 2440 may transmit and receive signals between other devices outside the system 2000 according to various communication protocols. The communication device 2440 may include an antenna, a transceiver, and/or a modem.

The connecting interface 2450 may provide connection between the system 2000 and an external device, which is connected to the system 2000 and capable of transmitting and receiving data to and from the system 2000. The connecting interface 2450 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 2394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The speaker 2460 and the display 2470 may serve as output devices configured to respectively output auditory information and visual information to the user of the system 2000.

The power supplying device 2480 may appropriately convert power supplied from a battery embedded in the system 2000 and/or an external power source, and supply the converted power to each of components of the system 2000.

According to an example embodiment, a method and a device capable of programming data in a memory device without a separate technique when a capacity of an internal buffer of a storage device is limited are provided, and a storage device in which the performance of a write amplification factor (WAF) is improved is provided.

In some example embodiments, each of the components represented by a block as illustrated in FIGS. 1-3 and 18 may be implemented as various numbers of hardware and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A method of operating a storage device which includes a non-volatile memory device, the method comprising:

generating data transfer length hint information indicating a length of data to be programmed in the non-volatile memory device through one programming operation;

sending the data transfer length hint information to a host;

receiving a first write command for data of a first stream and the data of the first stream from the host, wherein the data of the first stream associated with the first write command corresponds to the data transfer length hint information; and programming the data of the first stream in the non-volatile memory device.

2. The method of claim 1, further comprising:

receiving a second write command for data of a second stream and the data of the second stream from the host, wherein the data of the second stream associated with the second write command corresponds to the data transfer length hint information; and programming the data of the second stream in the non-volatile memory device.

3. The method of claim 1, wherein the first write command indicates a data transfer length of the data of the first stream, and wherein the data transfer length corresponds to the data transfer length hint information.

4. The method of claim 1, wherein the non-volatile memory device includes a plurality of memory cells and is controlled by a memory controller included in the storage device, and wherein the data transfer length hint information is generated by the memory controller.

5. The method of claim 4, wherein the generating the data transfer length hint information is based on a performance sensitivity of a stream, a type of a memory cell in which data are to be stored, and a limitation on a capacity of an internal buffer included in the memory controller.

6. The method of claim 4, further comprising sending the data transfer length hint information to the host as a first response to a read buffer command received from the host.

7. The method of claim 6, wherein the data transfer length hint information sent to the host is included in a DATA-IN universal flash storage (UFS) protocol information unit (UPIU).

8. The method of claim 4, further comprising sending a second response corresponding to writing the data of the first stream to the host.

9. The method of claim 4, further comprising sending the data transfer length hint information to the host as a third response to a query request command received from the host.

10. The method of claim 9, wherein the data transfer length hint information is included in a query response UPIU so as to be sent to the host.

11. The method of claim 4, wherein the data transfer length hint information indicates:

a point in time to start to generate a write command for each of one or more streams depending on the data transfer length hint information;

a number of data transfer length hints, which corresponds to a number of the one or more streams; and data transfer length hints corresponding to each of the one or more streams.

12. A method of operating a storage device which includes a non-volatile memory device, the method comprising:

writing data of a first stream in the non-volatile memory device included in the storage device;

sending a first response indicating completion of a first stream data write operation and one or more first data transfer length hints for the data of the first stream, to a host; and receiving a first write command for the data of the first stream and the data of the first stream from the host, wherein the data of the first stream associated with the first write command corresponds to the one or more first data transfer length hints, wherein the one or more first data transfer length hints indicate one or more data lengths by which the data of the first stream are programmed in the non-volatile memory device through one programming operation.

13. The method of claim 12, further comprising:

writing data of a second stream in the non-volatile memory device;

sending a second response indicating completion of a second stream data write operation and one or more second data transfer length hints for the data of the second stream, to the host; and receiving a second write command for the data of the second stream and the data of the second stream from the host, wherein the data of the second stream associated with the second write command corresponds to the one or more second data transfer length hints, wherein the one or more second data transfer length hints indicate one or more data lengths by which the data of the second stream are programmed in the non-volatile memory device through one programming operation.

14. The method of claim 12, further comprising generating the one or more first data transfer length hints based on a performance sensitivity of a stream, a type of a memory cell in which data are to be stored, and a limitation on a capacity of an internal buffer included in the storage device.

15. The method of claim 12, wherein the one or more first data transfer length hints indicate:

a point in time to start to generate the first write command for the data of the first stream depending on the one or more first data transfer length hints;

a number of one or more data transfer lengths of the first stream; and the one or more data transfer lengths.

16. The method of claim 12, further comprising:

writing the data of the first stream in the non-volatile memory device according to the first write command; and sending, by the storage device, a third response indicating that the data of the first stream are completely written in the non-volatile memory device, to the host.

17. The method of claim 16, wherein the third response is sent to the host as a response UPIU, and wherein the third response indicates a new first data transfer length hint.

18. The method of claim 17, further comprising:

determining whether there is a need to generate the new first data transfer length hint, based on whether a type of a memory cell where the data of the first stream are written changes and whether the data of the first stream are written in memory cells connected to an edge wordline; and generating the new first data transfer length hint based on the determining.

19. A storage device comprising:

a non-volatile memory device configured to store data; and a memory controller configured to control the non-volatile memory device and to generate data transfer length hint information, wherein the data transfer length hint information indicates one or more data transfer length hints for each of one or more streams, and wherein the data transfer length hints indicate one or more lengths of data to be programmed in the non-volatile memory device through one program operation.

20. The storage device of claim 19, wherein the data transfer length hint information indicates:

a point in time to start to generate a write command for data of each of the one or more streams depending on the data transfer length hint information; and a number of data transfer length hints, which corresponds to each of the one or more streams, and wherein the data transfer length hints respectively correspond to the one or more streams.

* * * * *